(12) United States Patent
Rorro et al.

(10) Patent No.: US 11,687,880 B2
(45) Date of Patent: Jun. 27, 2023

(54) AGGREGATED SUPPLY CHAIN MANAGEMENT INTERFACES

(71) Applicant: Target Brands, Inc., Minneapolis, MN (US)

(72) Inventors: Michael Rorro, Minneapolis, MN (US); Bryce Cooks, Minneapolis, MN (US); Anne Plaisted, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 129 days.

(21) Appl. No.: 17/136,740

(22) Filed: Dec. 29, 2020

(65) Prior Publication Data

US 2022/0207480 A1    Jun. 30, 2022

(51) Int. Cl.
*G06Q 10/0875* (2023.01)
*G06Q 10/0631* (2023.01)
*G06Q 10/0833* (2023.01)

(52) U.S. Cl.
CPC ... *G06Q 10/0875* (2013.01); *G06Q 10/06313* (2013.01); *G06Q 10/06314* (2013.01); *G06Q 10/0833* (2013.01)

(58) Field of Classification Search
CPC ......... G06Q 10/0875; G06Q 10/06313; G06Q 10/06314; G06Q 10/0833
See application file for complete search history.

(56) References Cited

U.S. PATENT DOCUMENTS

| 6,184,802 | B1 | 2/2001 | Lamb |
| 6,317,686 | B1 | 11/2001 | Ran |
| 6,374,176 | B1 | 4/2002 | Schmier et al. |

(Continued)

FOREIGN PATENT DOCUMENTS

| WO | WO 02/16457 | 2/2002 |
| WO | 2016076668 | 5/2016 |

OTHER PUBLICATIONS

Manuf Chowdhury (2016). Supply chain readiness, response and recovery for resilience. Article in Supply chain management—Sep. 2016. (Year: 2016).*

(Continued)

*Primary Examiner* — Peter Ludwig
(74) *Attorney, Agent, or Firm* — Barnes & Thornburg LLP

(57) ABSTRACT

In some implementations, a system for providing interfaces for visualizing and managing a supply chain includes an inventory readiness date system that is configured to generate inventory readiness dates for items in the supply chain. Inventory readiness dates can (i) be calendar dates on which the items are expected to be available for distribution at destination locations, (ii) be generated upon creation of orders for the items, (ii) be configured to remain fixed and unchanged for the items regardless of events affecting delivery of the items to the destination locations. The system can further include a supply chain data system that is configured to receive and aggregate supply chain information for the items from a plurality of supply chain data sources. The system can further include a supply chain tracking system that is configured to generate and present interfaces for visualizing and managing the supply chain.

20 Claims, 20 Drawing Sheets

(56) References Cited

U.S. PATENT DOCUMENTS

| | | | |
|---|---|---|---|
| 7,136,832 B2* | 11/2006 | Li | G06Q 10/06 340/505 |
| 7,900,153 B2 | 3/2011 | Damodaran et al. | |
| 7,969,306 B2 | 6/2011 | Ebert et al. | |
| 8,001,017 B1* | 8/2011 | Franco | G06Q 30/0601 705/28 |
| 8,050,956 B2* | 11/2011 | Abo-Hasna | G06Q 10/0631 14 705/7.22 |
| 8,229,791 B2* | 7/2012 | Bradley | G06G 1/14 705/28 |
| 8,352,382 B1* | 1/2013 | Katta | G06Q 50/28 705/330 |
| 8,639,591 B1 | 1/2014 | Mishra et al. | |
| 8,949,147 B1 | 2/2015 | Chowdhury | |
| 10,089,595 B2 | 10/2018 | Hoffman et al. | |
| 10,296,857 B2 | 5/2019 | Martin et al. | |
| 10,515,332 B2 | 12/2019 | Bielefeldt et al. | |
| 10,977,608 B2* | 4/2021 | Scheer | G06Q 10/08 |
| 2005/0171856 A1 | 8/2005 | Takahashi et al. | |
| 2005/0256787 A1 | 11/2005 | Wadawadigi et al. | |
| 2005/0265083 A1 | 12/2005 | Perry | |
| 2006/0142913 A1 | 6/2006 | Coffee et al. | |
| 2006/0224398 A1* | 10/2006 | Lakshman | G06Q 10/0833 705/333 |
| 2007/0038323 A1* | 2/2007 | Slocum | G06Q 10/087 705/28 |
| 2009/0259527 A1 | 10/2009 | Yang et al. | |
| 2011/0050397 A1 | 3/2011 | Cova | |
| 2011/0131201 A1 | 6/2011 | Lin | |
| 2011/0230994 A1 | 9/2011 | Spearman | |
| 2011/0231091 A1 | 9/2011 | Gourlay et al. | |
| 2012/0303498 A1* | 11/2012 | Cova | G06Q 10/08 340/572.1 |
| 2014/0089147 A1 | 3/2014 | Herndon | |
| 2014/0201001 A1 | 7/2014 | Rellas et al. | |
| 2015/0046363 A1 | 2/2015 | McNamara et al. | |
| 2015/0269517 A1 | 9/2015 | Berichon et al. | |
| 2015/0269617 A1 | 9/2015 | Mikurak | |
| 2015/0317598 A1 | 11/2015 | Stowe | |
| 2016/0004986 A1 | 1/2016 | Pothukuchi et al. | |
| 2016/0033289 A1 | 2/2016 | Tuukkanen et al. | |
| 2016/0110683 A1 | 4/2016 | Gupta et al. | |
| 2016/0129592 A1 | 5/2016 | Saboo et al. | |
| 2017/0083858 A1 | 3/2017 | Yoshikawa | |
| 2017/0255903 A1* | 9/2017 | Chowdhry | G06Q 10/0833 |
| 2017/0300851 A1* | 10/2017 | Bielefeldt | G06Q 30/02 |
| 2017/0340221 A1* | 11/2017 | Cronin | A61B 5/02438 |
| 2018/0082183 A1 | 3/2018 | Hertz et al. | |
| 2018/0094953 A1 | 4/2018 | Colson et al. | |
| 2018/0174449 A1 | 6/2018 | Nguyen | |
| 2018/0300669 A1 | 10/2018 | Gabrielson | |
| 2019/0066035 A1 | 2/2019 | Hance et al. | |
| 2019/0228375 A1 | 7/2019 | Laury et al. | |
| 2020/0322398 A1* | 10/2020 | Toksoz | H04L 67/53 |
| 2020/0375825 A1* | 12/2020 | Gerstner | G16H 20/00 |

OTHER PUBLICATIONS

Joseph Castrodale (2014). An inventory management readiness assessment model. Industrial Engineering Undergraduate Honors Thesis. (Year: 2014).*

David Luther (Sep. 18, 2020). 33 Inventory management KPIs and metrics for 2020. Netsuite. (Year: 2020).*

Dr. Camille Lewis (2019). Key metrics for an automated test equipment perofrmance based logistics sustainment program. IEEE. (Year: 2019).*

DLM 4000.25) (Dec. 2016). C21. Chapter 21 Stock Readiness Program. (Year: 2016).*

* cited by examiner

AGGREGATED SUPPLY CHAIN MANAGEMENT INTERFACES

TECHNICAL FIELD

This document generally relates to technology for supply chain management, including technology for tracking freight in transit through a supply chain.

BACKGROUND

Supply chains are, in general, complex networks through which goods are supplied from producers to retailers and, ultimately, consumers. For example, supply chains can involve many different producers that are generating products for distribution, each of which may emanate from multiple different production and/or distribution facilities. These products can be transported using any of a variety of carriers, such as trucks, railcars, and/or boats, and in many instances may involve using multiple different carriers as items are transported through the supply chain (e.g., boat for transport over ocean, rail to transport from port to distribution center, and truck from distribution center to retail store). Additionally, items may be processed through one or more distribution center before they ultimately are delivered to retail stores and/or directly to consumers. As a result, supply chains can generate large numbers of data records, such as data identifying items and carriers that are transporting the items.

Supply chain tracking and management systems have included features to simply present the data records associated with the supply chain. For example, supply chain management systems have provided users with the ability to view a current data record for an item in the supply chain as well as an ability to view a historical log of data records for the item.

SUMMARY

The disclosed technology is generally directed to improved interfaces, and the systems and process for providing such interfaces, for supply chain management to better and more accurately track and assess the state of the supply chain, including determining inventory readiness metrics which indicate whether loads, orders, and other aggregations of the supply chain are on schedule for delivery to distribution centers by a target date. The supply chain management interfaces described in this document can build off of and use inventory ready dates (IRD) for items in the supply chain, which can be the date on which items will arrive at and be available for distribution at a distribution center (e.g., inventory unloaded from truck and available within distribution center for redistribution to, for instance, retail store or direct customer shipment). The IRD can be a singular target date that different actors and users of the supply chain can unify around, such as buyers, suppliers, distributors, carriers, and retailers. Previously, these different actors may have each had their own target dates and deadlines, which may have looked at only their smaller portion of the supply chain without broader supply chain considerations. IRD can be a unified target date against which all actors within the supply chain can organize and unify their activities around, with the ultimate goal being the holistic improvement and satisfaction of the supply chain's objectives—to supply requested items to distributors and retailers to meet demand for the items. IRD can take into account each leg of the supply chain, combining logistics, inventory management, and field operations to ensure that the IRD is accurate.

The disclosed supply chain management interfaces can use the IRD to track and present status information for the supply chain, which can be used to more accurately assess and manage the supply chain, such as through prioritizing shipments that have fallen behind their target IRD. The disclosed supply chain management interfaces can also provide visualization tools that can be used to visualize the supply chain and its contents, and to manage the supply chain.

To provide these features, which help to provide improve tracking, management, and assessment of the supply chain, including understanding changes over time to the state of the supply chain (as well as projected future states of the supply chain), the disclosed technology can permit for portions of the supply chain to be aggregated and assessed as a group. Since supply chains can include large volumes of items and corresponding data items, making sense of this data feed can be overwhelming and can, in some instances, lead to more confusion and uncertainty about the state of the supply chain. However, the disclosed technology permits for items in the supply chain to be grouped according to one or more attributes, such as by order, by load, by projected delivery date, by carrier, by vendor, by product type (e.g., product SKU), and/or others, and for supply chain metrics for these groups to be generated, including IRD-based metrics that can be used to determine whether a group of items in the supply chain is on track, ahead of schedule, or behind schedule with regard to their designated IRDs. Such features can provide for enhanced real time insights and assessments regarding the supply chain, including high level assessments (e.g., assessment of entire supply chain) as well as more granular assessments (e.g., assessment of individual order or subparts thereof). Such features can also permit for use by a variety of users, who may be able to customize views and searches of the supply chain to generate groupings that meet their specific needs.

In some implementations, a system for providing interfaces for visualizing and managing a supply chain includes an inventory readiness date system that is configured to generate inventory readiness dates for items in the supply chain. Inventory readiness dates can (i) be calendar dates on which the items are expected to be available for distribution at destination locations, (ii) be generated upon creation of orders for the items, (ii) be configured to remain fixed and unchanged for the items regardless of events affecting delivery of the items to the destination locations. The system can further include a supply chain data system that is configured to receive and aggregate supply chain information for the items from a plurality of supply chain data sources. The system can further include a supply chain tracking system that is configured to generate and present interfaces for visualizing and managing the supply chain. The supply chain tracking system can be configured to perform operations including receiving a search request with search parameters from a client computing device, wherein the search parameters specify one or more portions of the supply chain for the search request; identifying, from the supply chain data system, a portion of the items that satisfy the search parameters; determining, using the supply chain information from the supply chain data system, current status information for the portion of the items in the supply chain; retrieving, from the inventory readiness date system, a portion of the inventory readiness dates that correspond to the portion of the items; generating multi-factor metrics for the portion of the items based on (i) the current status information for the portion of the items and (ii) the portion of the inventory readiness dates that correspond to the portion of the items, wherein the multi-factor metric indicates a current state of the supply chain for the portion of the items; and outputting the multi-factor metric for presentation in an interface on the client computing device.

Such a system can optionally include one or more of the following features. Generating multi-factor metrics for the portion of the items can include identifying a plurality of metrics that are part of the multi-factor metric; identifying enumerated categories for the plurality of metrics; and determining item proportions of the portion of the items that satisfy the enumerated categories, wherein the multi-factor metrics include the item proportions. Determining item proportions of the portion of the items that satisfy the enumerated categories can include, for a first metric of the plurality of metrics: identifying first enumerated categories for the first metric; and determining first groups of items that correspond to the first enumerated categories. Items from the portion of items can be allocated to the first groups based on which of the first enumerated categories they satisfy. For a second metric of the plurality of metrics, operations can include: identifying second enumerated categories for the second metric; for each of the first groups of items: determining second groups of items that further subdivide the first group of items and correspond to the second enumerated categories, wherein items from the first group of items are allocated to the second groups based on which of the second enumerated categories they satisfy; and determining aggregate first group values for the first groups of items and aggregate second group values for the second groups of items within each of the first groups. Item proportions can include the aggregate first group values and the aggregate second group values.

The first metric can include a current location for the items, and the second metric can include a current inventory readiness date status of the items that is determined based on a comparison of the current location for the items relative to one or more milestones that are part of the inventory readiness dates for the items. The first metric can include a current inventory readiness date status of the items that is determined based on a comparison of a current location for the items relative to one or more milestones that are part of the inventory readiness dates for the items, and the second metric can include the current location for the items. The inventory readiness dates can include milestone dates by which milestone events are identified to occur to stay on track to satisfy the inventory readiness date. The first metric can include a date on which milestone events occur, and the second metric can include the milestone events. The inventory readiness dates can include milestone dates by which milestone events are identified to occur to stay on track to satisfy the inventory readiness date. The first metric can include the milestone events, and the second metric can include a date on which milestone events occur.

The first metric can include vendors that are supplying the items, and the second metric can include a current inventory readiness date status of the items that is determined based on a comparison of current locations for the items relative to one or more milestones that are part of the inventory readiness dates for the items. The first metric can include carriers that are transporting the items from source locations to the destination locations, and the second metric can include a current inventory readiness date status of the items that is determined based on a comparison of current locations for the items relative to one or more milestones that are part of the inventory readiness dates for the items. The first metric can include distribution centers that comprise the destination locations the items, and the second metric can include a current inventory readiness date status of the items that is determined based on a comparison of current locations for the items relative to one or more milestones that are part of the inventory readiness dates for the items. The first metric can include retail departments into which the items are classified within a retail environment, and the second metric can include a current inventory readiness date status of the items that is determined based on a comparison of current locations for the items relative to one or more milestones that are part of the inventory readiness dates for the items. The first metric can include product taxonomies for the items within a retail environment, and the second metric can include a current inventory readiness date status of the items that is determined based on a comparison of current locations for the items relative to one or more milestones that are part of the inventory readiness dates for the items.

Outputting the multi-factor metric for presentation in the interface on the client computing device can include designating a first visual elements for presentation in the interface that correspond to the first aggregate group values, and designating, for each of the first aggregate group values and its corresponding first visual element, second visual elements that correspond to the second aggregate group values that further subdivide the first aggregate group value, the second visual elements being designated for presentation within a visual boundary of a corresponding first visual element. The first visual elements and the second visual elements can be output for presentation in the interface on the client computing device.

The portion of the items can include particular items that are part of one or more orders specified in the search parameters. The orders can be spread across multiple loads in the supply chain. The portion of the items can include particular items that part of one or more loads specified in the search parameters. The particular items can be distributed across multiple different orders in the supply chain. The portion of the items can include particular items that are supplied by one or more vendors specified in the search parameters. The portion of the items can include particular items that are transported by one or more carriers specified in the search parameters. The portion of the items can include particular items that are being delivered to one or more distribution centers specified in the search parameters.

The systems, devices, program products, and processes described throughout this document can, in some instances, provide one or more of the following advantages. For example, given the magnitude of supply chain data, it can be challenging to determine the current status and state of the supply chain (e.g., on track, behind schedule, ahead of schedule). The disclosed technology provides improved solutions, over convention supply chain management systems and platforms, in that it is able to simplify this problem and provide a comprehensive solution that can permit for tracking and assessing the supply chain at a variety of different levels of granularity (e.g., load level, distribution center level, retail store department level). For instance, through the use of load tracking and order tracking, which can build on load tracking results, can be used to generate inventory readiness metrics (e.g., ahead of schedule, behind schedule, on track relative to IRD) across multiple different dimensions, including across loads (e.g., trucks, boats, trains), across orders (e.g., purchase order placed with vendors), and/or other groupings of items in the supply chain.

In another example, the disclosed technology can improve supply chain management. For instance, complex orders made of hundreds, thousands, or millions of items can be tracked to create metrics that are far more simple than the raw tracking data, while still providing a viewer with enough information to understand the status of the order. This technology can be used for orders that will be supplied from many sources, to be sent to many destinations, by many different types of cargo haulers.

DESCRIPTION OF DRAWINGS

Like reference symbols in the various drawings indicate like elements

DETAILED DESCRIPTION

As described above, this document describes systems, processes, platforms, and interfaces for more accurately tacking and assessing of the state of the supply chain, including for more accurately determining and assessing whether groupings of items in the supply chain (e.g., loads, orders, and other groupings) are on schedule for delivery to distribution centers. This technology uses an inventory ready date (IRD) as a key target for inventory shipped to destinations by the supply chain. From the IRD, various other milestone dates can be calculated. Then, orders consisting of hundreds, thousands, or millions of items are created to meet the IRD. From this, intermediate deadlines are created that, if met, make meeting the IRD likely. Metrics can be generated and displayed based on the items meeting or not meeting the deadlines created by this system.

Figure 1:
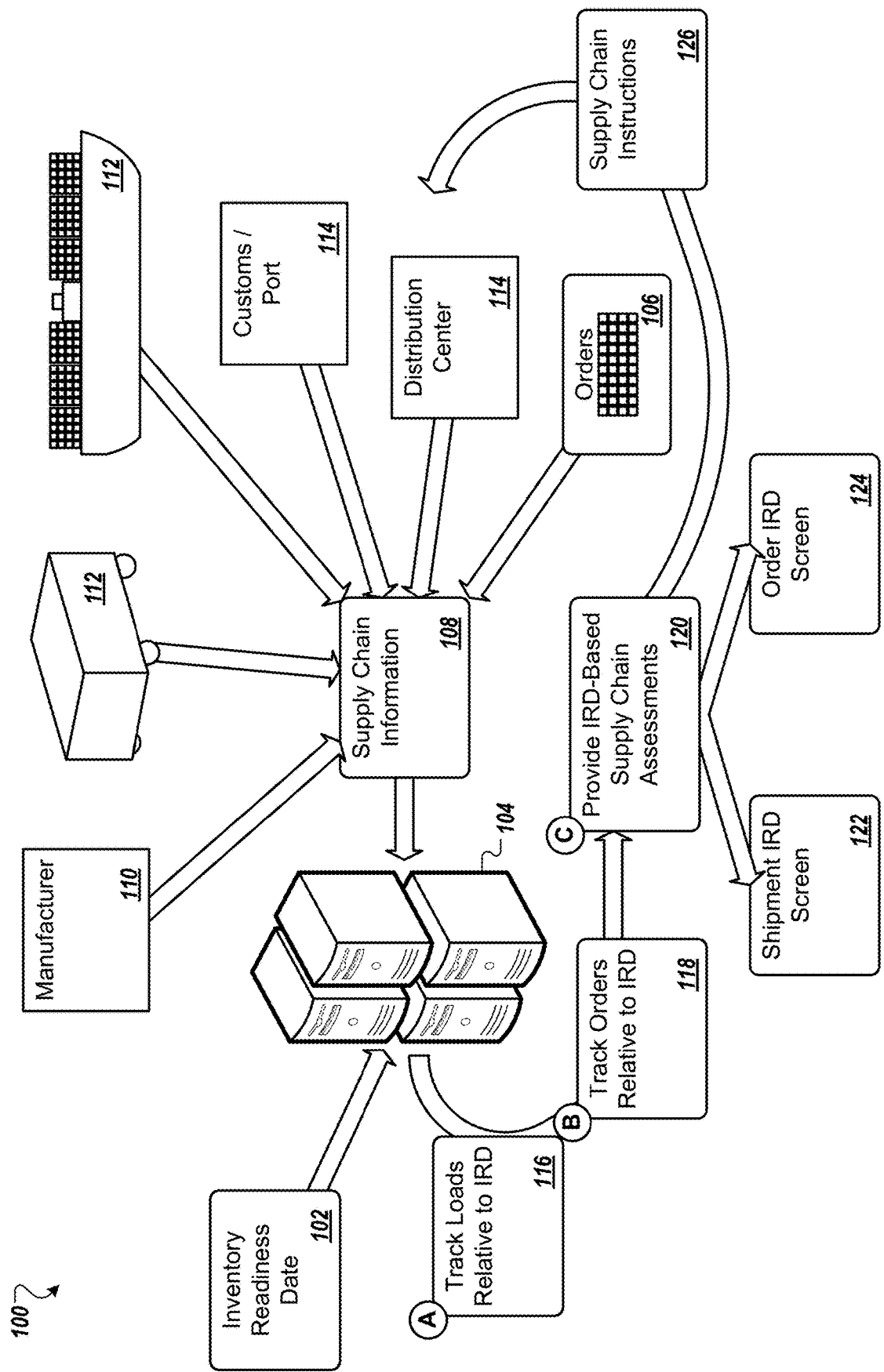
FIG. 1 shows a diagram of a system for generating inventory readiness metrics.

FIG. 1 shows a diagram of a system 100 for generating inventory readiness metrics. In general, an IRD 102 represents the date at which items ordered in a single order should be ready for use in a warehouse, distribution center, store, or other end location. This IRD 102 may be different, and later, than the day the items arrive at the distribution center. For example, if it takes 24 hours to unload a truck, unpack boxes, open containers, etc., before the item is sitting on the shelf ready to be accessed, the IRD 102 may be one day later than the day that the item should arrive in the truck at the distribution center.

A supply chain management computer system 104 can receive information for one or more orders 106. The orders 106 may each specify a collection of information. For example, the orders 106 may specify a list of items, a destination for each item (e.g., various stores, distribution centers), a source for each item (e.g., a factory, manufacturer, or other source of the item), price information, and/or handling information (e.g., weight, size, compatible containers). Each order 106 may be matched to an inventory readiness date 102. In this way, a large, multi-facility enterprise may be able to create complex, multi-item, multi-facility orders in a unified process.

To monitor the status of the order (e.g., to help a user understand if the manufacturers and suppliers are shipping the ordered items), the supply chain management computer system 104 can receive supply chain information 108 that contains information about the supply chain that is used to complete the orders 106. For example, the supply chain information 108 can include reporting data from manufacturers 110, including estimated and actual dates of manufacture, dates of shipment, etc. The supply chain information 108 can include reporting data for containers 112, including railcars, container trucks, ships, etc. The reporting data for containers 112 can include scheduling information, location tracking information, route information, etc. The supply chain information 108 can include reporting data from intermediate locations 114, including customs, ports, and distribution centers. In general, these intermediate locations can include locations where items, or containers holding the items, are temporarily held when in transit from their source (e.g., a manufacturer) to their destination (e.g., a fulfilment center). In some cases, the computer system 104 can filter, decorate, or otherwise alter the supply chain information 108 on receipt. For example, a large enterprise may generate a very large amount of data. Of this data, only a portion may be needed, and the unneeded portions may be filtered out. Similarly, the computer system 104 may decorate incoming supply chain information 108. For example, geolocation information may be decorated with the state or country in which the location resides.

The received information may be structured in the form of data events that each record a physical event that occurs in the supply chain. For example, a load arriving at a destination may create an event, a GPS location heartbeat message may be an event, etc. These events may be listened to by various components of the computer system 104 and, upon receipt of a new event, may launch one or more of the processes described in this document. In some cases, events may cause the update to data related to an order or load (e.g., updating location, IRD risk, or other data).

The supply chain management computer system 104 can use the received information 102, and 108 to track loads 116 relative to the IRDs 102. For example, a load in a truck may contain items for five different orders 106. The supply chain management computer system 104 may determine, for each of those five orders, if the truck's estimated arrival date will make that order's items on time, early, or late. The truck may have an estimated arrival date supplied by the trucking company, but this estimated arrival date may be different from the dates needed for IRDs 102 to be on time. For example, a delay up-stream of the shipping at the manufacturer 110 may make an IRD 102 in danger of being missed, even if the shipping by truck is done in an appropriate time. In such a way, a truck may be "on time" according to the trucking company, but the items in the truck may be "on time", "early", or "late" according to the IRDs 102. By separating the analysis of a carrier's performance with IRD risk, different and more useful information can be generated by the system. For example, a carrier that happens to receive loads late through no fault of their own (e.g., they service a port that has been experiencing bad weather, delaying unloading of boats) can be seen as performing well even if their loads have high IRD risk. Similarly, a carrier that often has unexpected delays but carries loads with low IRD risk may be seen as performing poorly.

The supply chain management computer system 104 can track 118 orders relative to IRDs 102. For example, with the status of each item in a load relative to IRD 102 known, the supply chain management computer system 104 can aggregate the IRD status of items in a single order across containers. This can include items from multiple sources being shipped to multiple destinations. In such a case, the breakdown of IRD status may not be a single number or value, but may instead be a multi-factor distribution of values. For example, 92% of items in an order may be on time, 5% may be early, and 3% may be late. This may be caused by most trucks carrying the items to different distribution centers carrying on-time items, two trucks carrying moving ahead of schedule, and one truck carrying items being delayed.

The supply chain management computer system 104 can provide 120 IRD-based supply chain assessments. For example, the supply chain management computer system 104 can generate one or more computer screens in the form of HTML web pages, application interfaces, or static reports that report the status of loads relative to IRD 122, orders relative to IRD 124, or in other formats. In addition, the computer system 104 can also use the IRD-based supply chain assessments to update and improve the operations of the supply chain. For example, one or more computer-readable instructions 126 can be generated in order to implement, modify, cancel, and/or otherwise perform various supply chain operations by supply chain actors, such as manufacturers 110, carriers transporting containers 112, distribution centers and ports 114, purchase ordering systems 106, retail stores, and/or other systems and actors that are part of a supply chain. For example, the supply chain assessment 120 can be used to generate supply chain instructions 126 to send to a carrier 112 and/or intermediate location (e.g., port 114, distribution center 114) to expedite a particular load that has many items with high IRD risk. These instructions may be automatically generated and configured to cause one or more systems (e.g., automated systems, a package handling system, truck dispatch system) to perform one or more actions that can reduce the overall IRD risk of the supply chain.

Figure 2:
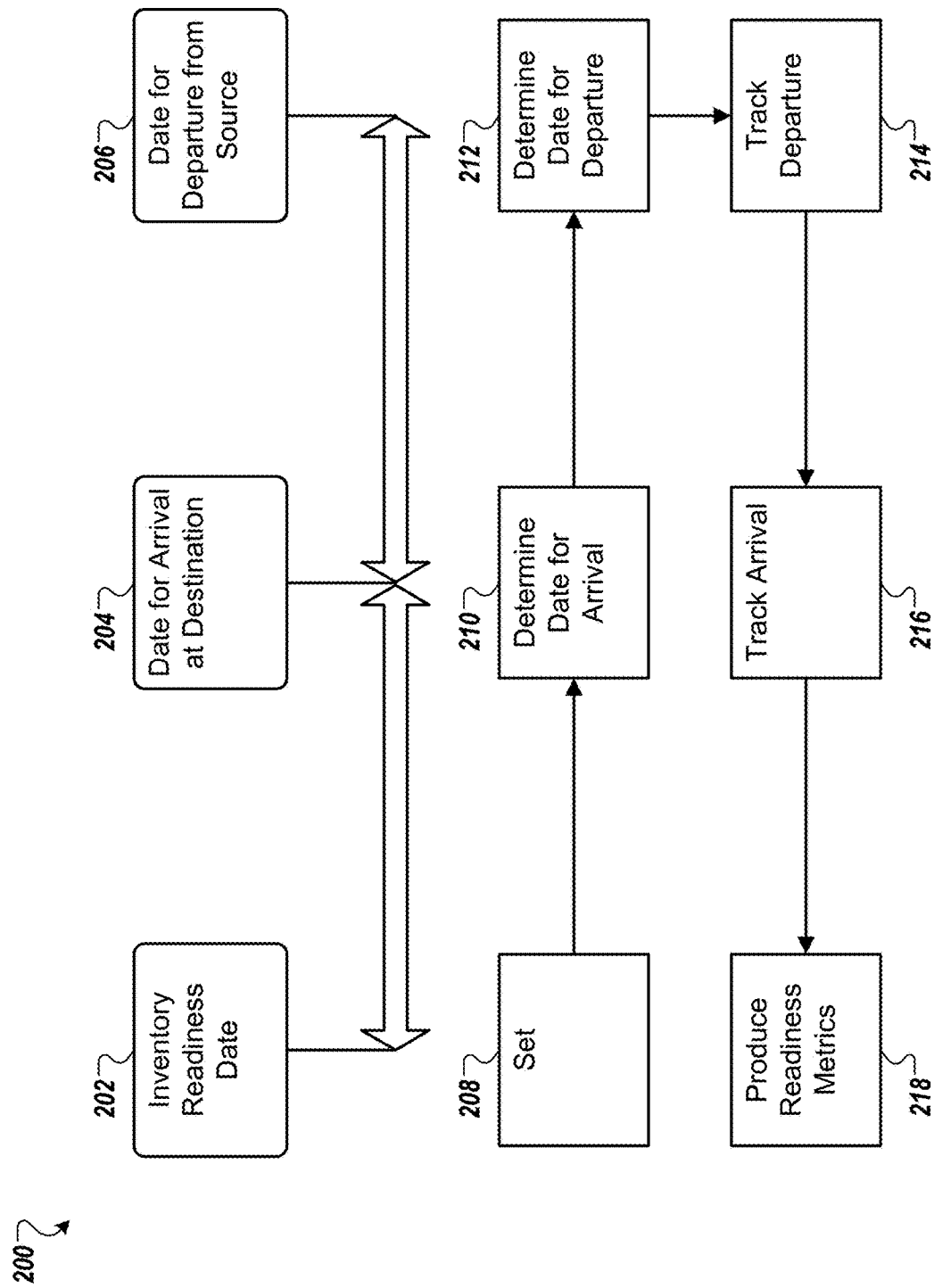
FIG. 2 shows a flowchart of a process of generating inventory readiness metrics.

FIG. 2 shows a flowchart of a process 200 of generating inventory readiness metrics. In the process 200, an IRD 102 is set 208, and then from there intermediate dates are determined based on various factors of the supply chain. In general, these intermediate dates act as benchmarks to aid in the evaluation of IRDs 102—if the intermediate dates are being met, the order is likely on time, and if the intermediate dates are not being met, the order is likely to be late.

One intermediate date can be a date for arrival at destination 204, which may include a distribution center, a store, etc. As previously explained, the item may not be ready for use when it initially arrives at its destination. It may need to be unloaded, unpacked, inspected, assembled, and placed on a shelf, etc., before it is available for use. This process may take a significant enough amount of time that i) the process may impact the IRD if it goes slower than normal and ii) the process may be abstracted away without impacting the accuracy of the IRD analysis. For example, an item traveling down a two foot ramp from the back of a shelf to the front may take seconds and be fast enough to not need accounted for, but the unpacking discussed here may involve hours or days of work from arrival at the destination.

One intermediate date can be a date of departure from the item's source 206. This source may in some cases be the location where the item is manufactured, mined, generated, or assembled. In some cases, the source may be the first point at which the supply chain is automatically monitored. For example, a supplier of raw materials may not provide detailed, electronic tracking information until the raw materials arrive at the customs-controlled port where the material is being exported. In such a case, the customs-controlled port may be the source of the item, even if it is hundreds of miles from where the raw material is grown, extracted, manufactured, etc.

Two intermediate dates are shown here, but other intermediate dates can be used, including more or fewer dates. For example, if the items must from the source by rail car, then by ship, then by truck before arrival at the destination, additional intermediate dates may be used to represent the transition from rail to ship, and from ship to truck, as well as additional intermediate dates within each of those modes of transit (e.g., intermediate date for carrier reaching one or more intermediate locations and/or progress points). Additional and/or alternative intermediate dates can include stops in which some, but not all, of a load are unloaded or loaded. For example, a truck may have a load with items destined for two different retail stores, and each arrival and departure from the two retail stores may also have an intermediate date.

An IRD is set 208. For example, a computer system can receive, from outside of the computer system, input that specifies and IRD. This input may take the form of user input entering the data through a graphical user interface (GUI). This input may take the form of a data message transmitted over a data network. The receiving computer system can, using the input, store the IRD to computer memory to specify a first calendar date on which an order of items should be ready at each items' respective destination location. In some cases, the IRD is received as part of input that specifies the order for the computer system.

An arrival date is determined for each item of the order 210. For example, the computer system may access data for each item of the order and identify a destination for that item. For example, the order may specify one million identical items, with ten thousand items being ordered for each of one hundred distribution centers located across a country. Each distribution may have recorded the number of days that the center normally takes to unload and make ready such items—one day, two days, or three days. As such, the computer system may determine arrival dates 204 for each distribution center that are one day, two days, or three days before the IRD 202. As such, for each item of the order, an arrival date is set before the readiness date, the arrival date specifying a second calendar date on which the item should arrive at the item's respective destination location.

A departure date is determined for each item of the order 212. For example, the computer system may access data for each item of the order and identify a source for that item. For example, the items may be shipped from one of three factories spread across the country. Given the source of the item along with the destination now, the computer system can determine a length of time needed to transport the item from the source to the destination. Working backwards from the arrival date 204, the computer system can determine a departure date before the arrival date, the departure date specifying a third calendar date on which the item should depart the item's respective source location. For example, if a particular item has an IRD 202 of Friday, an arrival date 204 of Thursday, and requires two days to transit from the source to the destination, a departure date of Tuesday may be determined.

In some cases, determining, for each item of the order, an arrival date and determining, for each item of the order, a departure date, comprises querying a user for the second calendar date and the third calendar date. For example, the computer system may generate one or more GUIs to provide a user with an order specification screen. The user may input, into the screen, details about the order. This can include the IRD, the arrival date 204, and the departure date. In some implementations, this information may be generated based on secondary considerations input by the user. For example, the user may specify an IRD 202 and request arrival dates and departure dates calculated to reduce transit costs, time in transit, storage overhead, etc. In another example, the user may enter the departure date, as that may be inflexibly set by the manufacturer, and from there the GUI may guide the user to select other aspects of the order (e.g., shipping method or IRD), and the system may proposed values given those inputs (e.g., providing an IRD given the shipping method, providing a recommended shipping method given the IRD).

Events such as departure events are tracked 214 and arrival events are tracked 216. For example, as the items move through the supply chain, the computer system may receive tracking updates of such movement and identify transit events (e.g., departure events, arrival events). Based on these events, the computer system can keep up-to-date of location data for each item. In addition, estimates of future arrivals and/or departures can be updated based on the new information, and these projections can be compared against IRD to determine the risk level for various items (e.g., high risk of item missing IRD based on projected arrival date). For example, if a load arrives to one destination a day early, projected future arrivals and departures may be adjusted by one day to reflect this updated understanding of load status, which can additionally update the IRD-based status of the items contained with the load.

In some cases, this process can include receiving tracking data from a plurality of shipping containers, each shipping container containing at least one of the items. These shipping containers can include vehicles such as trucks, rail cars, and ships that may have global positioning data (GPS) or route data reported. These shipping containers can include boxes, bins, bags, or pallets that include bar codes, wireless data tags, or other technology used to generate tracking information. As the various types of shipping have different real-world capabilities and options (e.g., trucks can unload at a store, but boats are unlikely to) data for each type of container can be configured to reflect those real world capabilities and options. As such, data for different containers may be handled differently by the systems.

Readiness metrics are produced 218. For example, for each item of the order discussed in this example, the computer system can generate an inventory readiness metric based on the item's travel based on tracking data for the item as the item travels from the item's respective source location to the respective destination location. For example, the computer system can compare actual departure events and actual arrival events to the planned arrival date 204 and the planned departure date 206.

In one example, items that actually depart or arrive before their planned dates can be tagged as "ahead of schedule", items that actually depart or arrive on their planned dates can be tagged as "on schedule", and items that actually depart or arrive after their planned dates can be tagged as "behind schedule." In another example, the metric can report a risk of being behind schedule. Items with actual dates ahead of or on the planned dates can be tagged as low risk, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

As tracking events are received, the computer system can continually update the IRD metrics. For example, a particular item may have an actual departure date matching the planned departure date 206. The rail car carrying the item may be delayed in transit, taking four days to travel instead of the planned two, resulting in an actual arrival date that is two days after the planned arrival date 204. In such a case, the item may initially be given an "on time", "green" or otherwise favorable IRD metric. However, when the arrival date lapses (or when another intermediate date lapses), the computer system can update the readiness metric for that item to "late", "red", or otherwise unfavorable.

Figure 3:
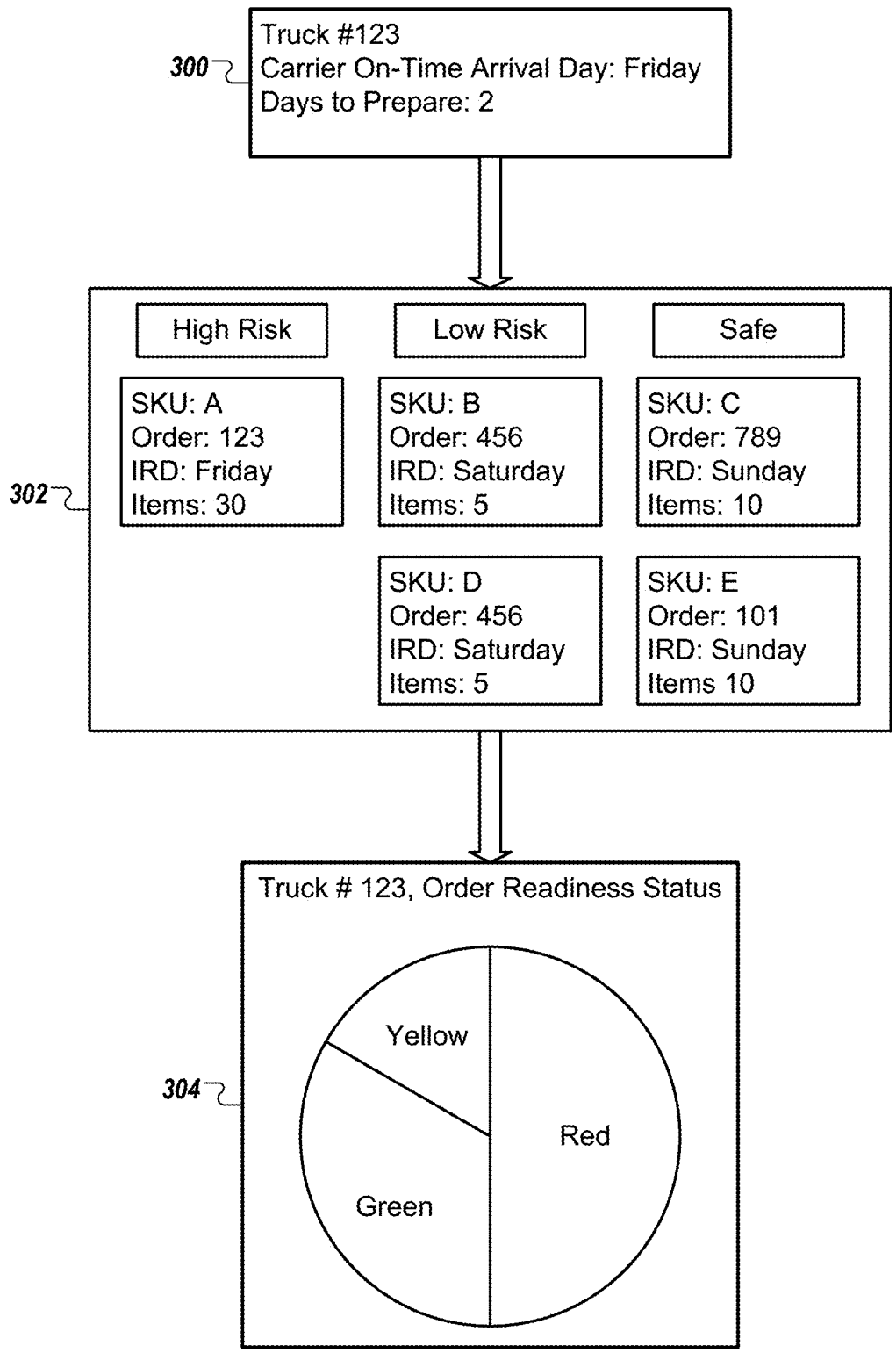
FIGS. 3 and 4 show schematic diagrams of an example readiness metric.

FIG. 3 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 300 can be stored by a computer system to record data related to a container that is used to ship items for an order. For example, items for the order may be recorded as in transit on truck #123. The carrier may have a carrier-scheduled on-time arrival date of Friday. However, as explained above, this date may be different from the IRD or other intermediate dates used to determine IRD metrics. In addition, the data 300 can record the number of days needed to unpack and make ready the items once they reach their destination.

Data 302 can be stored by the computer system to maintain the IRD status of items in the truck #123. In this example, the truck is carrying a total of 60 items across five Stock Keeping Units (SKUs). These 60 items are each assigned to one of four orders, but have been shipped in the truck #123 to enhance overall efficiency of the supply chain. Because they are part of different orders, they may have assigned different IRDs. As such, items from the same truck—a truck that the carrier identifies as "on time"—can nevertheless have different IRD metrics. In this case, items with an IRD of Friday are more than a day behind schedule and marked as "high risk", items a day behind schedule are marked as "at risk", while items on schedule are marked as "safe".

Report 304 reports the risk status of the items in the truck in the form of a multi-factor metric that represents the inventory readiness metric of each item contained by the container. Of note, the pie chart of the report 304 reports risk weighted by item count, not by SKU. So while there are five SKUs in the truck, one SKU contains half of the items and those items are at risk. As such, the pie chart shows half of the area marked "red" for "high risk". Similarly, "low risk" and "safe" have the same number of SKUs but different numbers of items, and thus the "yellow" and "green" areas are of unequal size.

The report 304 may be displayed to a user on a screen, by being printed on paper, etc. With this information, the user can quickly identify the status of the items in the truck and determine if any remedial action should be taken. For example, as this report contains large amounts of red followed by yellow, the user may identify it as a high-priority for redial action. As such, the user may generate an order for the supply chain to expedite the truck #123.

Figure 4:
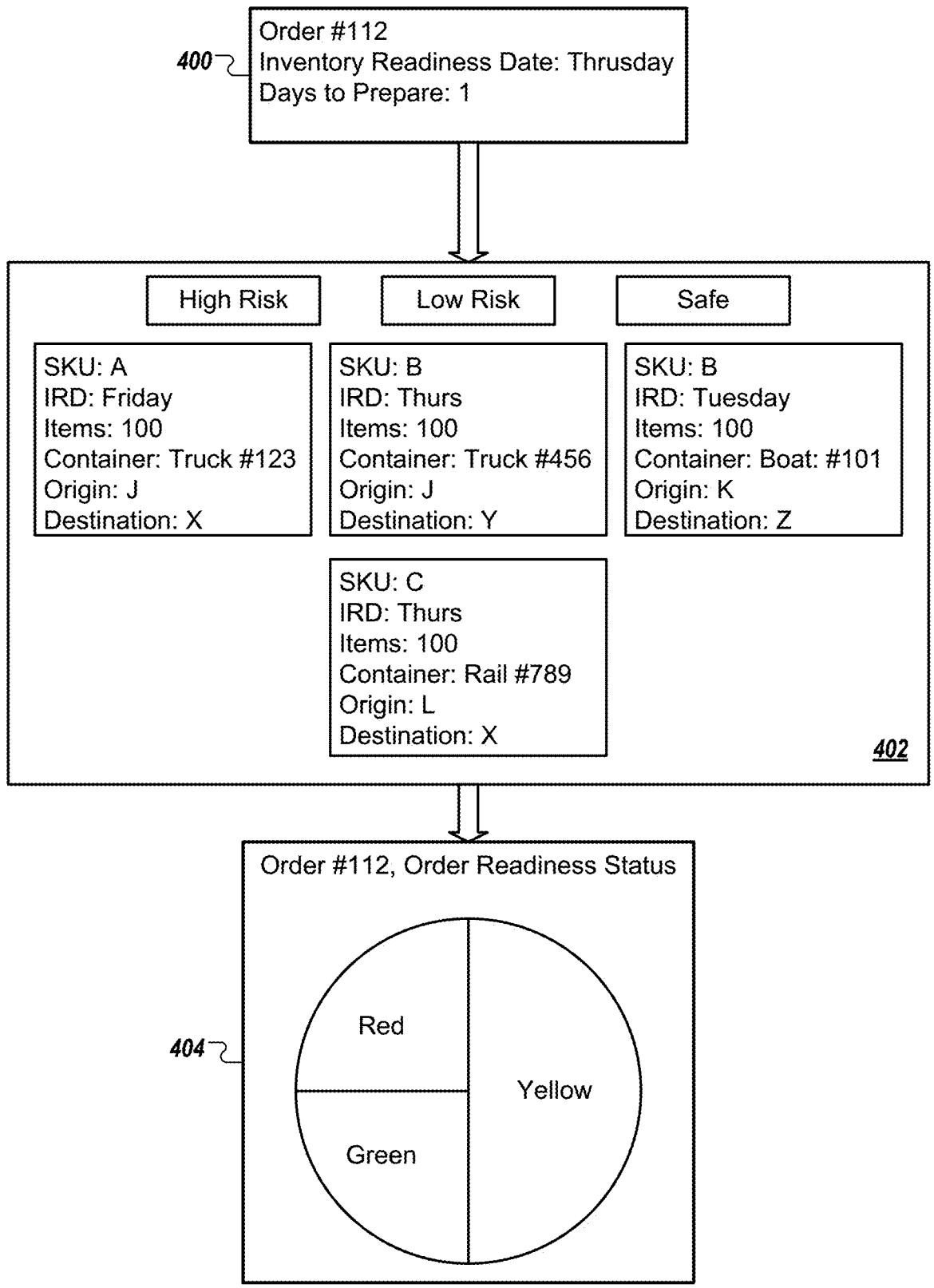

FIG. 4 shows a schematic diagram of an example readiness metric. In this example, the metric can report a risk of being behind schedule. Items with actual dates ahead of or on the planned dates can be tagged as a "safe" risk level, items with actual dates behind the planned dates may be marked as "low risk" of missing their IRD, representing the supply chain's flexibility to expedite some items when needed, and items with actual dates more than a day after their planned dates can be marked as "high risk" of missing their IRD.

Data 400 can be stored by a computer system to record data related to items for an order across many containers. For example, items for the order #112 may be recorded with associated metadata. For example, the data 400 can record the IRD for an order and number of days needed to unpack and make ready the items once they reach their destination.

Data 402 can be stored by the computer system to maintain the IRD status of items in the order #112. In this example, 400 items are being transported from various sources, to various destinations, as grouped together by three different SKUs of items (A, B, and C) being transported from three different origin locations (J, K, and L) to three different destinations (X, Y, and Z across four different containers, truck #123, truck #456, rail car #789, and boat #101. As depicted by the combinations of SKU, source location, destination location, and containers that are part of order #112, an order can include multiple different items (e.g., SKUs A, B, and C) that are fulfilled from multiple different source locations (e.g., origins J, K, and L) to multiple different destination locations (e.g., destinations X, Y, and Z) using multiple different carriers (e.g., truck #123, truck #456, rail car #789, and boat #101). Due to this complexity, simply tracking the progress of each of portion of an order is a challenge, let alone the added difficulty in assessing the overall and current IRD-based risk of the order (and its component parts) being unavailable across all of these different moving parts (e.g., different SKUs, source locations, destinations, containers). For example, because each items that is part of the order (represented by SKUs) may be at different points in its transit path, they may have assigned different statuses. As items transition along their transit path, which may include being transferred between different containers, the status of the items and their projection relative to IRD can be updated (e.g., events identifying progress of items can be received and used to update IRD-based status for items). As such, items set to arrive at least a day before the IRD are set to "safe", items set to arrive on the IRD date are marked "low risk", and items arriving after the IRD date are marked as "high risk". Other rating schemes may be used.

Report 404 reports the risk status of items in the order in the form of a first multi-factor metric that represents the inventory readiness metric of each item of the order. Of note, the pie chart of the report 404 reports risk weighted by item count, not by container. However, in this case, each container contains the same number of items, so the size of each section of the chart happens to correlate to the number of containers in each risk category.

The report 404 may be displayed to a user on a screen, by being printed on paper, etc. With this information, the user can quickly identify the status of the items in the order and determine if any remedial action should be taken. For example, as this report contains large amounts of red followed by yellow, the user may identify it as a high-priority for redial action. As such, the user may generate an order for the supply chain to temporarily halt activities that use many of the items in the order #112.

Figure 5:
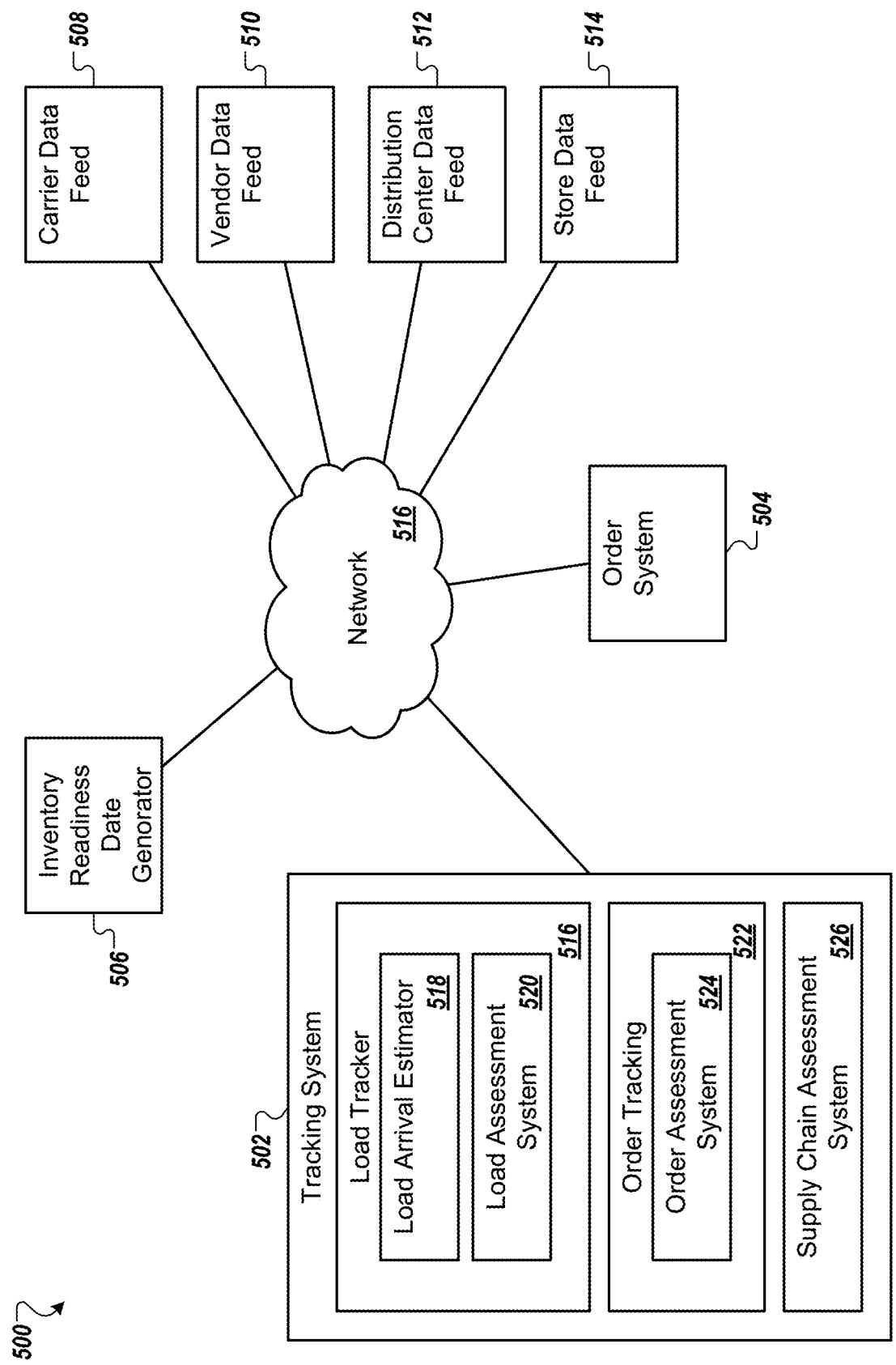
FIG. 5 shows a diagram of a system for generating inventory readiness metrics.

FIG. 5 shows a diagram of a system 500 that includes computer devices that operate to generate inventory readiness metrics. In the system 500, a tracking system 502 can receive data from other elements of the system 500 and can generate new data to report on the status of the supply chain. For example, an order system 504 can report, to the tracking system 502, details about orders that are to be fulfilled using the supply chain. This order information can include a listing of items in the order, sources for the items, destinations for the items, etc. An inventory readiness date generator 506 can generate, from the order information and other data in the system 500, inventory readiness dates for the orders.

Various data feeds can supply data to the tracking system 502 on an ongoing basis. A carrier data feed 508 can supply the tracking system 502 with carrier tracking data. This data can include shipping events (e.g., departure from a particular location by a particular container), status data (e.g., geolocation data, speed, direction, fuel status), and carrier-based-status values (e.g., on time, ahead of schedule, or late, according to carrier quality of service agreements).

A vendor data feed 510 can supply the tracking system 502 with vendor tracking data. This data can include vendor events (e.g., sale of items that are ordered), status data (e.g., where items are in the manufacturing process), and vendor-based-status values (e.g., if the manufacturing process is on time, ahead of schedule, or late, according to vendor contracts). A distribution center data feed 512 can supply the tracking system 502 with distribution center tracking data. This data can include information about the status of items in the distribution center (e.g., including both items that were ordered as part of the orders discussed above and items not ordered as discussed), and the capabilities of the distribution center (e.g., time to unload items, ability to sort and assemble parts). A store data feed 514 can supply the tracking system 502 with store tracking data. This data can include information about the status of items arriving and for sale at stores, and the capabilities of the stores (e.g., time to unload items, ability to sort and assemble parts).

A network 516 can provide data communication between elements of the system 500. For example, the data network can create, maintain, and tear down data connections that allow messages to be sent by one element and received by another element. The network 516 can include the Internet, private networks, public networks, etc.

The tracking system 502 can include a load tracker 516 that is able to execute operations to track loads of items. For example, the load tracker 516 may maintain, in computer memory, a list of loads in containers. This list of containers can also include, for each container, a list of items in the load, the order number of the items, the locations of the containers, etc. A load arrival estimator 518 can execute operations to estimate arrival times of loads. For example, the load estimator 518 may maintain, in computer memory, a list of planned arrival dates (e.g., arrival dates 204) for each load being tracked. The load estimator 518 may also store other data to determine if the loads being tracked are likely to meet their planned arrival dates. For example, this data may include intermediate benchmarks, geolocation data, travel velocity, traffic data, weather data, etc. This other data may be submitted to a classifier to identify one or more likely arrival dates.

A load assessment system 520 may submit this other data (e.g., the intermediate benchmarks, geolocation data, travel velocity, traffic data, weather data, etc.) to one or more classifier functions that return one or more estimated arrival dates, given the input. This estimated date may take the form of a single date estimated to be the most likely, a plurality of dates each having an associated confidence value, etc.

The tracking system 502 can include an order tracking system 522 that is able to execute operations to track orders of items. For example, the order tracker may maintain, in computer memory, a list of orders of items. This list of orders can also include, for each order, a list of containers containing items of the order, SKUs of the items, etc. A order assessment system 524 may submit data received from the load tracker 516 (e.g., estimated arrival times) to one or more classifier functions that return one or more order risk scores that report the risk each item of the order has of missing its assigned IRD.

A supply chain assessment system 526 of the tracking system 502 can generate assessments of the supply chain. For example, the system 526 can generate the screens 112 and 124, the report 304, and or the report 404.

Figure 6:
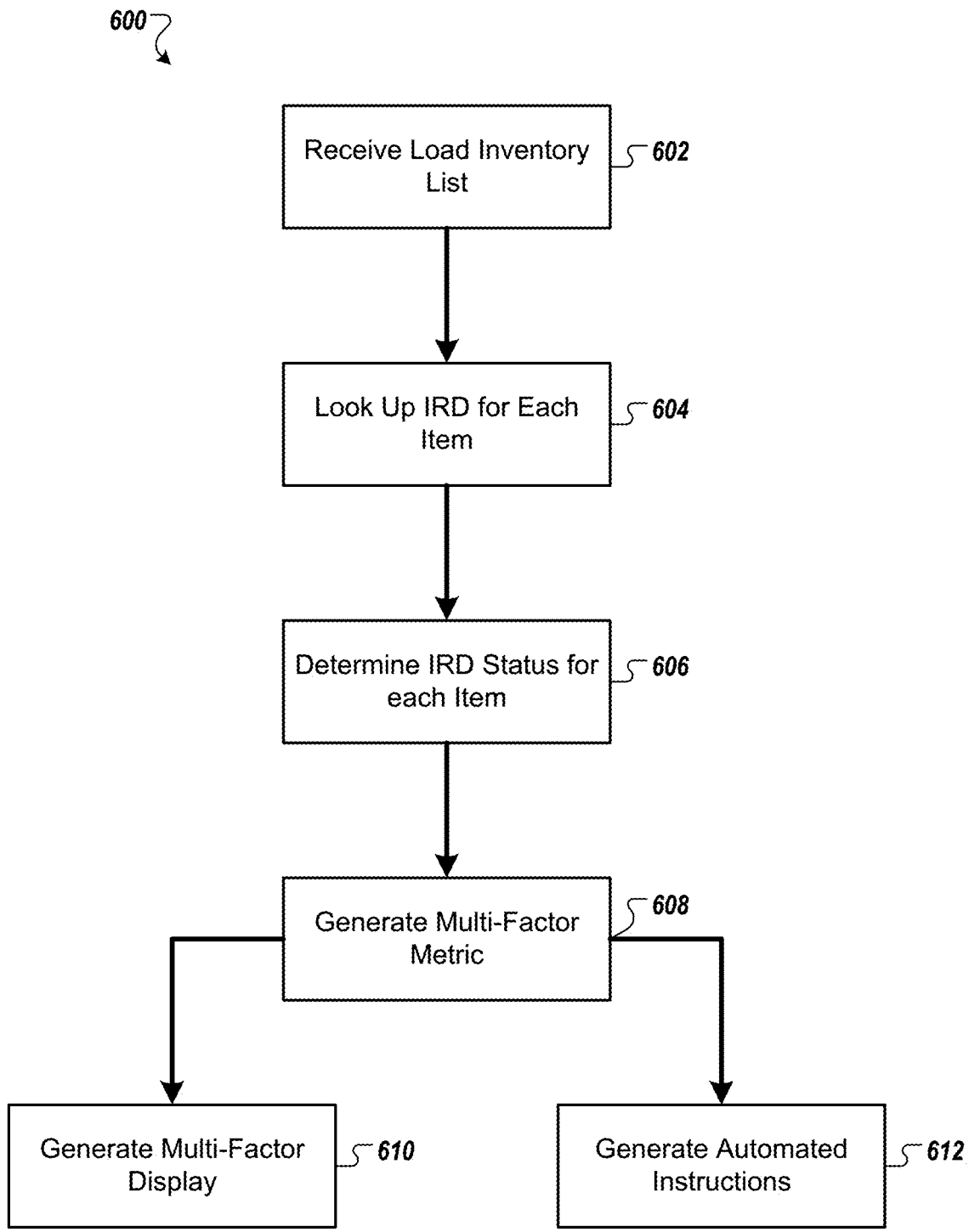
FIG. 6 shows a flowchart of a process for tracking inventory readiness metrics for a container of items.

FIG. 6 shows a flowchart of a process 600 for tracking inventory readiness metrics for a container of items. For example, the process 600 can be performed by the tracking system 502. Therefore, the process 600 will be described with reference to the system 500. The process 600 may be performed, for example, after a new order has been received and IRDs have been set for the items contained within the order.

A load inventory list is received 602. For example, the load tracking system 502 can receive, from the vendor data feed 510, a file listing all items that are packaged into a single pallet on a truck. Additionally or alternatively, the load tracking system 502 can receive, from the carrier data feed 508, a file listing all items that are on a truck. The load tracker 518 can update, in computer memory, data related to each of these items to specify that the item is associated with the truck.

IRDs for each item of the inventory list are looked up 604. The load assessment system 520 can listen for updates in the computer memory. When the new load information is created in 602, the load assessment system 520 can access IRD dates for each item from the IRD generator 506, as well as other data such as intermediate dates, etc.

An IRD status for each item is determined 606. The load assessment system 520 can compare the status of each item in the load against the next upcoming date (e.g., intermediate date, delivery date) to determine the length of time (e.g., in days, hours, minutes, and/or seconds) available to meet the next upcoming date. The load assessment system 520 may supply this information to a classifier that takes, for example, the length of time and other related data to produce an IRD status. The status may take the form of a risk value, a risk classification, an expected delay value, etc.

A multi-factor metric for the load is generated 608. For example, the multi-factor metric may record, for each item in the load, the items IRD status. This recording may aggregate the statuses (e.g., a count of each status value, a summation of delay values) or may keep the statuses individual.

A multi-factor display is generated 610. For example, one or more GUI screens or static reports may be generated to display the multi-factor metric of IRD for the single load. This may take the form of a pie chart, bar chart, overall risk value, etc.

Automated instructions are generated 612. For example, computer instructions can be assembled from template instructions to alter the function of the supply chain. These instructions may be transmitted by data network to one or more automated systems that can operate on the instructions. These instructions may be structured in a way that improves the IRD risk of one or more items, or of the supply chain in total. For example, a load may be expedited to hop to the front of an unloading queue at a dock or loading bay.

Figure 7:
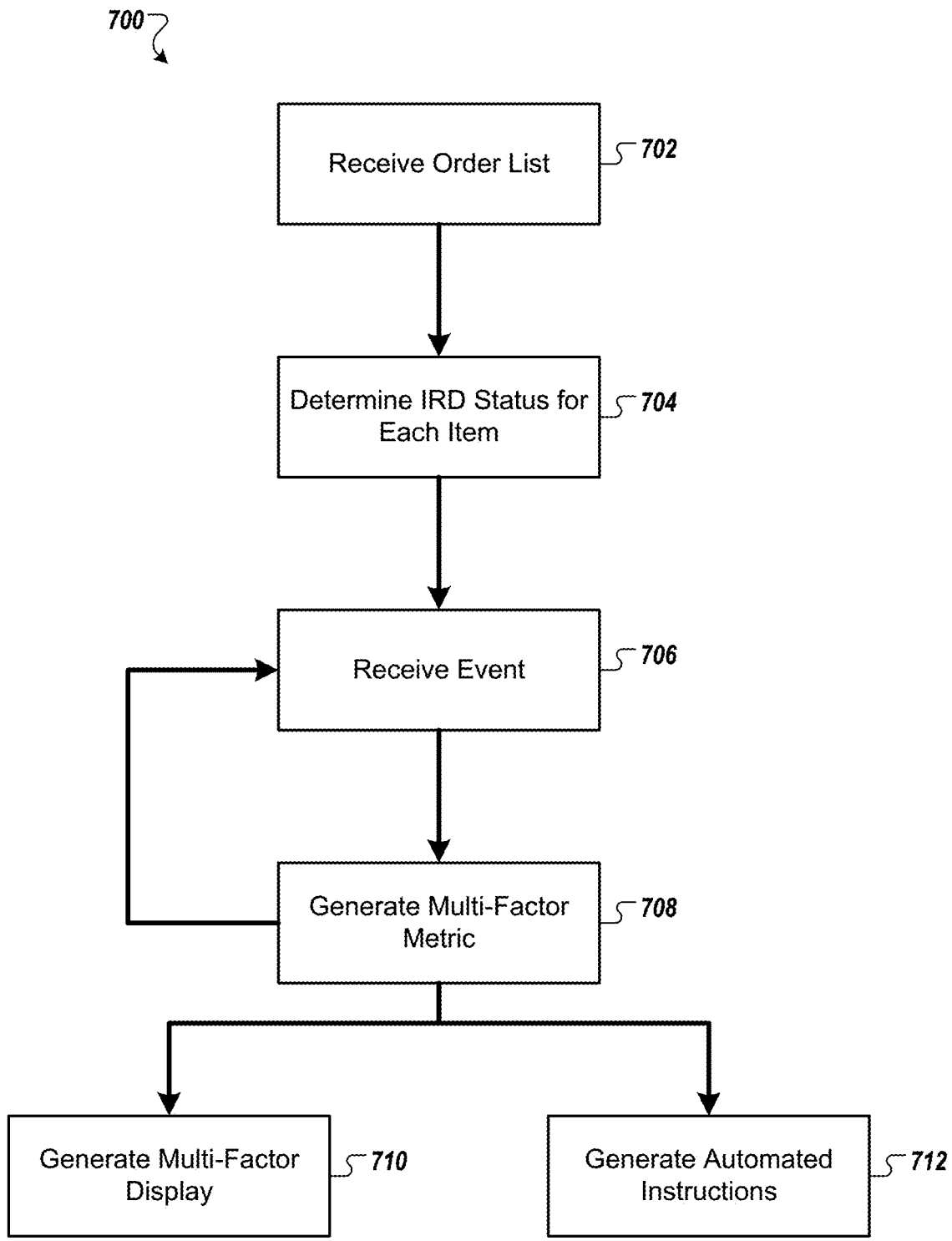
FIG. 7 shows a flowchart of an example process for tracking inventory readiness metrics for an order of items.

FIG. 7 shows a flowchart of an example process 700 for tracking inventory readiness metrics for an order of items. For example, the process 700 can be performed by the tracking system 502 after performing the process 600. Therefore, the process 700 will be described with reference to the system 500.

An order list is received 702. For example, the load tracking system 502 can receive, from the order system 504, a file listing all items specified by a single order. Additionally or alternatively, the order tracking system 522 can receive, from other data sources, a list of all loads that specify items in the load. From this complete list of loads, order may be assembled by combining items with similar order characteristics. The order tracking system 522 can store this order tracking information in computer memory.

An IRD status for each item is initially determined up 704. The order assessment system 524 can listen for updates in the computer memory. When a new order list is created in 702, the order assessment system 524 can access IRD dates for each item from the IRD generator 506, as well as other data such as intermediate dates, etc. The order assessment system 524 can compare the status of each item in the order against the next upcoming date (e.g., intermediate date, delivery date) to determine the length of time (e.g., in days, hours, minutes, and/or seconds) available to meet the next upcoming date. The order assessment system 524 may supply this information to a classifier that takes, for example, the length of time and other related data to produce an IRD status. The status may take the form of a risk value, a risk classification, an expected delay value, etc.

Events can be listened for, and when a new event is received 706, multi-factor metric for the order is generated 708. When new events (e.g., GPS location updates, arrivals, departures, damage to a load), IRDs related to that event may be updated. For example, when a load's location is updated, that location is compared to a location estimate and the IRDs of the load can be adjusted as needed. The multi-factor metric may record, for each item in the order, the items IRD status. This recording may aggregate the statuses (e.g., a count of each status value, a summation of delay values) or may keep the statuses individual.

A multi-factor display is generated 710. For example, one or more GUI screens or static reports may be generated to display the multi-factor metric of IRD for the single order. This may take the form of a pie chart, bar chart, overall risk value, etc.

Automated instructions are generated 712. For example, computer instructions can be assembled from template instructions to alter the function of the supply chain. These instructions may be transmitted by data network to one or more automated systems that can operate on the instructions. These instructions may be structured in a way that improves the IRD risk of one or more items, or of the supply chain in total. For example, a load may be expedited to hop to the front of an unloading queue at a dock or loading bay.

Figure 8:
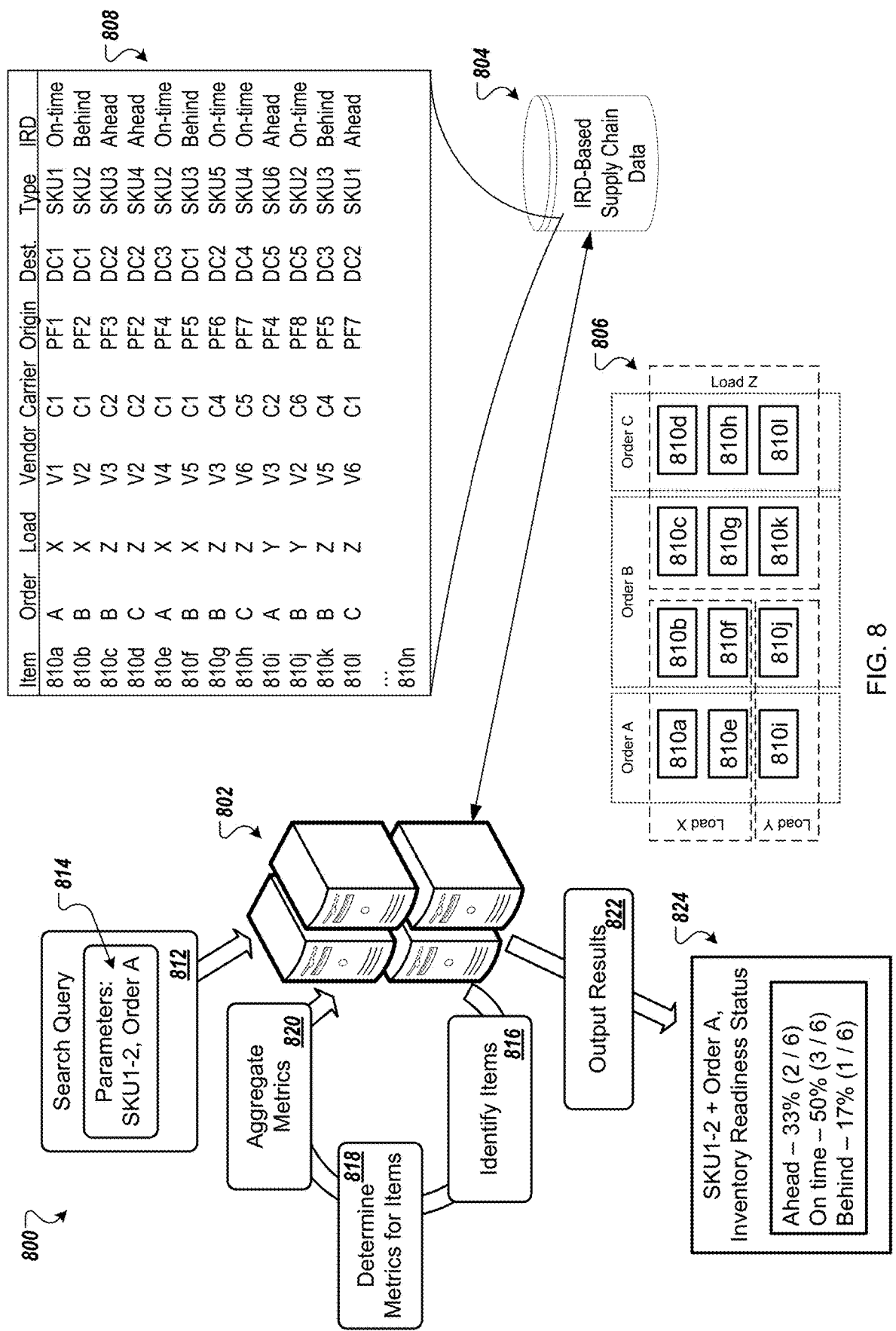
FIG. 8 is a conceptual diagram of an example system for providing improved aggregated interfaces for supply chain management.

FIG. 8 is a conceptual diagram of an example system 800 for providing improved aggregated interfaces for supply chain management. The system 800 includes a supply chain management computer system 802, similar to the supply chain management computer system 104 described above with regard to FIG. 1 and the tracking system 502 described above with regard to FIG. 5.

The system 800 is configured to generate aggregated information and assessments on the status of the supply chain in ways that permits for various groupings, including designated groupings within the supply chain architecture (e.g., groupings according designated groups, like orders and loads) as well as for customized groupings that may not be explicitly designated (e.g., groupings according to product type, vendor, carrier, destination, IRD, origin, projected delivery date). Additionally, the system 800 is configured to acknowledge and permit for items within the supply chain to exist within multiple different groupings simultaneously, which can be used separately, in combination, and/or concurrently to view and assess the state of the supply chain.

For instance, the example diagram 806 shows example items 810*a*-1 that are currently in transit in a supply chain. Each of these items 810*a*-1 is part of an order, with three examples depicted (Orders A-C), and is also part of a load that is transporting the item 810*a*-1 through the supply chain, with three example loads depicted (Loads X-Z). Accordingly, each of the items 810*a*-1 is part of two different logical groups—one group being order-based groups and another group being load-based groups. However, these designated groups are only two of multiple different possible groupings of items within the supply chain. For example, referring to the table 808 showing example supply chain data for the items 810*a*-1, each item is associated with data entries for multiple additional data fields (or dimensions) that can be used to group the items. In the depicted example, each item is associated with multiple different data fields, including the order, load, vendor, carrier, origin location, destination location, product type (SKU), and IRD for the item. Additional and/or alternative data fields are also possible. The IRD field can be, for example, the target date on which the item is expected to be available at a distribution center (or other destination location), the IRD-based status for the item (e.g., on-time, ahead, behind), and/or other IRD-based data features for the items.

Since the system 802 and the corresponding supply chain database 804 associates each individual item in the supply chain with its own IRD and has its own IRD-based status, which may be independent of the other items that are part of the same designated group (e.g., part of same order or same load) or other data field-based grouping (e.g., delivery to same distribution center), the system 802 is able to determine aggregate metrics for any of a variety of groupings of the supply chain, including IRD-based metrics. For example, if items within a load were treated as having a group-based status dictated by the status of the load, then such aggregate metrics would not be possible (or would not be possible with much accuracy) because the item status would be synonymous with the load status, which would not take into account the separate and distinct IRDs for each item, which is based to some extent on the parameters of the order under with the items were purchased. Instead, the system 802 and the database 804 determine and track IRD for each individual item separate from the status of their designated groupings (e.g., apart from order and load), which permits for the status of customizable groups of items, outside of these designated groupings, to be readily and accurately assessed.

For example, a user managing a distribution center may be interested in determining the aggregate IRD-based status of all items that are bound for a particular distribution center, regardless of the order or load that the items are part of. Using the system 802 and the database 804, the user obtain aggregate metrics for all items that are bound for the distribution center, which can indicate whether items are on track, behind, or ahead of schedule. Such insights can be helpful in a variety of ways, such as for staffing various teams within a distribution center (e.g., unload team, break pack team) based on modifications from expected in and outbound shipments.

The system 802 can permit such aggregate metrics to be generated through the use of queries, which may be provided based on user input and/or based on automated input/requests from other systems, devices, and/or processes. For example, at 812 a search query is transmitted with parameters 814, which in this example specify that aggregate metrics be provided for a group that includes items of product type SKU1, product type SKU2, and items that are part of Order A. The parameters can specify not only input for the query (e.g., the grouping of items that is requested), but can also specify the output that is being requested (e.g., specify one or more metrics that are requested as output from the query). For example, the parameters 814 can specify output metrics for the search to include IRD-based status information for the groups that are correlated with milestones for the items in the group—permitting a user to visualize the status of the grouped items along two different dimensions.

In response to receiving the query, at 816 the system 802 can identify items from the database 804 that satisfy the parameters 814. For example, the system can query the database 804 and, for the example parameters 814, can identify items 810*a* (satisfies "Order A" and "SKU1" parameter), 810*b* (satisfies "SKU2" parameter), 810*e* (satisfies "Order A" and "SKU2" parameters), 810*i* (satisfies "Order A" parameter), 810*j* (satisfies "SKU2" parameter), and 8101 (satisfies "SKU1" parameter).

At 818, the system 802 determines metrics for the identified items. For example, if output metrics are specified in the parameters 814, then those metrics can be determined for each of the identified items (e.g., 810*a*, 810*b*, 810*e*, 810*i*, 810*j*, 810*l*). For instance, if the output metric is specified as IRD-based status, then the IRD-based status (examples provided in the "IRD" column in table 808) can be determined for each of the identified items.

At 820, the system 802 aggregates and combines the individual determined metrics for each of the identified items to generate an aggregated metric for the query. Aggregation can involve, for example, identifying enumerated categories for the metrics being assessed and then slotting the identified items into each of the enumerated categories to determine combined values. Such aggregation may involve, for example, simply counting the number of items that fall into each of the enumerated categories for a metric, aggregating values associated with the items (e.g., number of eaches for every item, associated monetary value associated with item), and/or other combinations of values. As an illustrative example, if IRD-status is the metric being determined for the query, the enumerated categories can be "on-time," "ahead," and "behind" and the aggregation can involve simply counting the number of identified items (e.g., 810a, 810b, 810e, 810i, 810j, 810l) that fall into each of these categories.

At 822, the system 802 can output the results. For instance, an display output that can be provided on a user computing device (or transmitted to another computing device that requested the query), such as the example interface element 824 that shows the IRD-based status for the group of items satisfying the query parameters 814.

The data is depicted in the table 808 as being presented in a single database 804, but it may be split across multiple different databases and, in some instances, some of the data values may be determined and/or updated based on triggering events (instead of being persistently maintained). For example, the IRD-based status for an item may be updated whenever a new event associated with a load or other container transporting the item is received. Furthermore, the data contained in the database 804 can be decorated with additional data elements, which may be drawn from correlations and associations across other systems, to permit for fast querying and information retrieval without having to perform the associations and correlations at runtime.

The system 802 and database 804 can be configured to provide global/aggregated views across some or all of the supply chain in real time, which can be provided for by, for example, classifying supply chain data with additional data (e.g., product class data) and through the use of intermediate data structures that aggregate the supply chain data on a recurring basis. For example, querying across the entirety of the supply chain data to generate global views on a frequent basis could become slow and take resources away from other important tasks. The use of intermediate data structures, such as additional databases that store results provided by step 822 that are run across large swaths of the database 804 (e.g., during periods of low volume for the database 804), can eliminate some or all these problems. Additionally, linking individual data elements within the supply chain to other associated data (e.g., product classes), which can then be extrapolated to and associated with other data elements (e.g., associated with department and division data using product taxonomies within retail environment), can permit for broader insights to be readily generated in real time.

Figure 9:
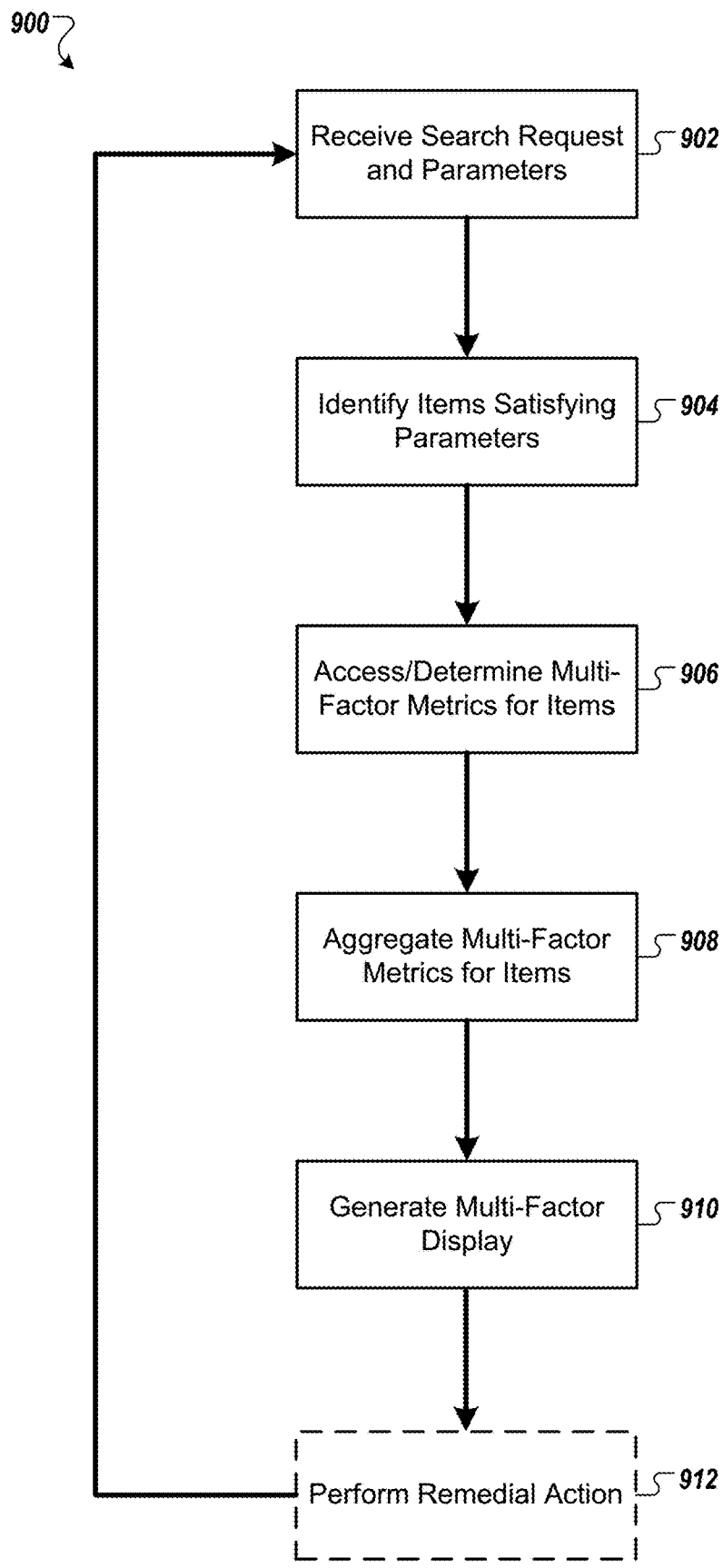
FIG. 9 is a flowchart of an example process for generating multi-factor metrics for a group of items in a supply chain.

FIG. 9 is a flowchart of an example process 900 for generating multi-factor metrics for a group of items in a supply chain. The example process 900 can be performed by any of a variety of appropriate systems, such as the supply chain management computer system 802 described above with regard to FIG. 8, the supply chain management computer system 104 described above with regard to FIG. 1, and the tracking system 502 described above with regard to FIG. 5.

At 902, a search request and parameters can be received, similar to the description above with regard to 812. For example, the search request can be received from a user computing device in response to user input specifying the request and parameters. In another example, other computer systems can automatically submit queries to the system, which can be used by the other computer systems for a variety of purposes.

At 904, items satisfying the parameters can be identified. For example, the parameters can include designated groupings of items, such identifiers for one or more orders and/or identifiers for one or more loads. The parameters can also identify one or more non-designated groupings, such as identifying a carrier and/or destination location. Parameters can combine groups (e.g., union of different groups through inclusive OR operator), such as combining items from multiple different orders. Parameters can also require intersection of groups (e.g., intersection of items that are in particular order and also on particular load through AND operator). Other operators and combinations can be specified by the parameters. Identification as part of step 904 can be performed similar to 816 described above with regard to FIG. 8.

At 906, multi-factor metrics that are being determined as part query can be either accessed and/or determined for each of the identified items, similar to the description above regarding 818 in FIG. 8. For example, in some instances the multi-factor metrics may be predetermined and/or cached, and those data values can simply be accessed. In other instances, the multi-factor metrics may need to be determined in response to receiving the search request.

At 908, the multi-factor metrics for the identified items can be aggregated, similar to the description above regarding 820 in FIG. 8. A more detailed process for aggregating multi-factor metrics is described below with regard to FIG. 10.

At 910, a multi-factor display can be generated. For example, the aggregated multi-factor metrics for the grouped items can be transmitted and presented in an interface on a user computing device. Examples of this are presented and described below with regard to FIGS. 11-15B.

At 912, which may be optionally performed in some implementations, can include performing one or more remedial actions related to information presented in the multi-factor display (step 910). Such remedial action can be initiated automatically by the system, for example, based on one or more thresholds, parameters, and/or rules being satisfied in relation to the multi-factor metric. Additionally and/or alternatively, such remedial action can be performed in response to user direction. Remedial actions can include, for example, transmitting instructions to one or more supply chain actors to modify tasks and/or prioritizations of tasks that are being performed. Other remedial actions are also possible. The process 900 can repeat across steps 902-912, permitting for requests and parameters to be submitted and presented, including providing updates to previously submitted requests as the underlying data changes.

Figure 10:
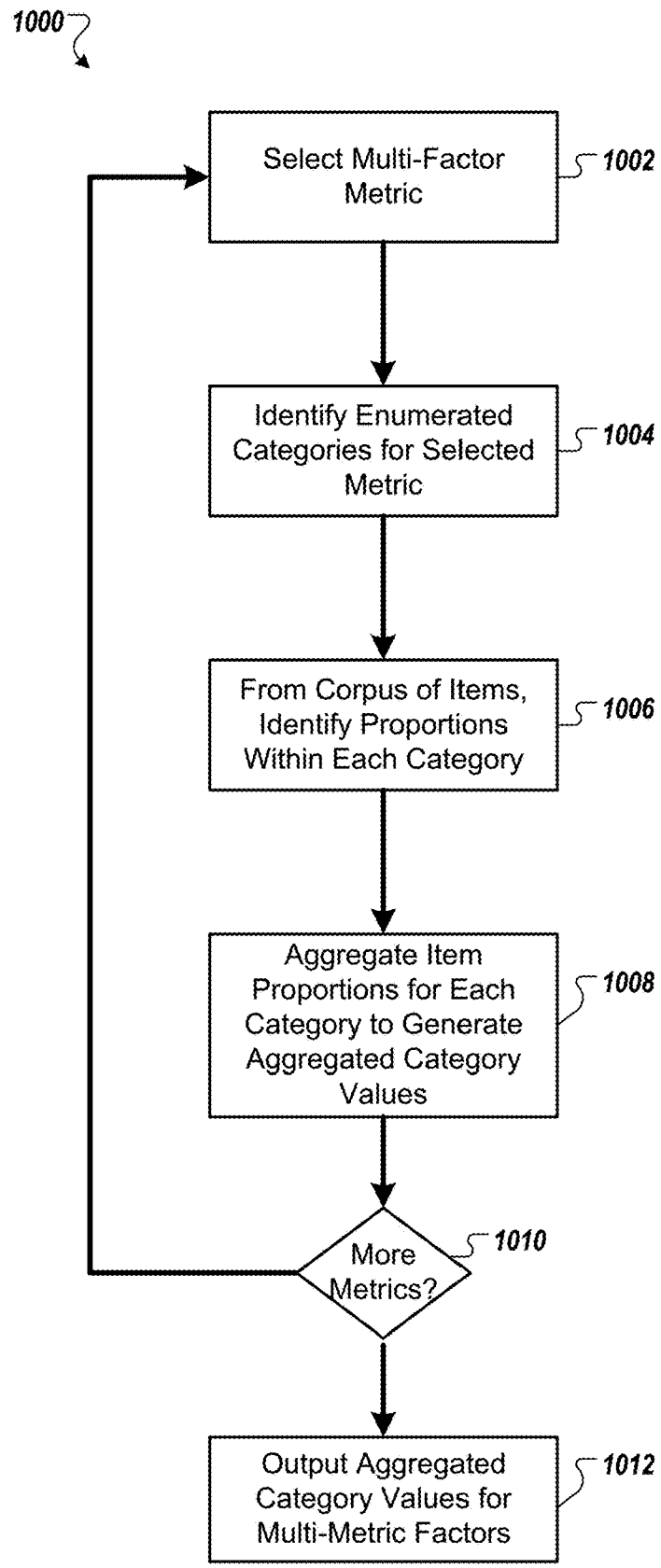
FIG. 10 is a flowchart of an example process for generating multi-factor metrics for a group of items in a supply chain.

FIG. 10 is a flowchart of an example process 1000 for generating multi-factor metrics for a group of items in a supply chain. The example process 1000 can be performed by any of a variety of appropriate systems, such as the supply chain management computer system 802 described above with regard to FIG. 8, the supply chain management computer system 104 described above with regard to FIG. 1, and the tracking system 502 described above with regard to FIG. 5. The example process 1000 can be performed as part of other processes, for example as part of process 900 at step 908.

At 1002, a multi-factor metric is selected. The selected multi-factor metric may be one of multiple different multi-factor metrics that are requested as part of a query. Examples of multi-factor metrics include IRD-based status, milestones, carriers, vendors, origin, delivery date, destination, and/or others.

At 1004, enumerated categories for the selected multi-factor metric are selected. For example, as described with regard to FIG. 8, the enumerated categories for the IRD-based status can include "on-time," "ahead," and "behind."

At 1006, the proportions of items that fall within each of the enumerated categories for the selected multi-factor metric can be determined. For example, each of the items can be slotted into an appropriate category for the multi-factor metric.

At 1008, the items proportions for each category can be aggregated to generate aggregated category values. Such aggregated category values can be determined in any of a variety of ways, such as by counting the items themselves within each of the categories, aggregating values associated with the items (e.g., aggregating eaches for the items in each category, aggregating monetary value for the items in each category), and/or other statistical combinations of data values.

At 1010, a determination can be made as to whether more metrics should be evaluated. If more metrics exist, then the process 1000 can repeat steps 1002-1008 for each of the additional metrics. If no more metrics exist, then the process 1000 can proceed to step 1012.

At 1012, the aggregated category values for the multi-metric factors can be output. Such outputting can include correlating multi-factor metrics with each other, when there is more than one metric specified. For example, if the multi-factor metrics include both milestones and IRD-based status, then the categories that are determined and aggregated can include combinations of the categories for both the milestones and IRD-based status so that aggregated values.

Figure 11:
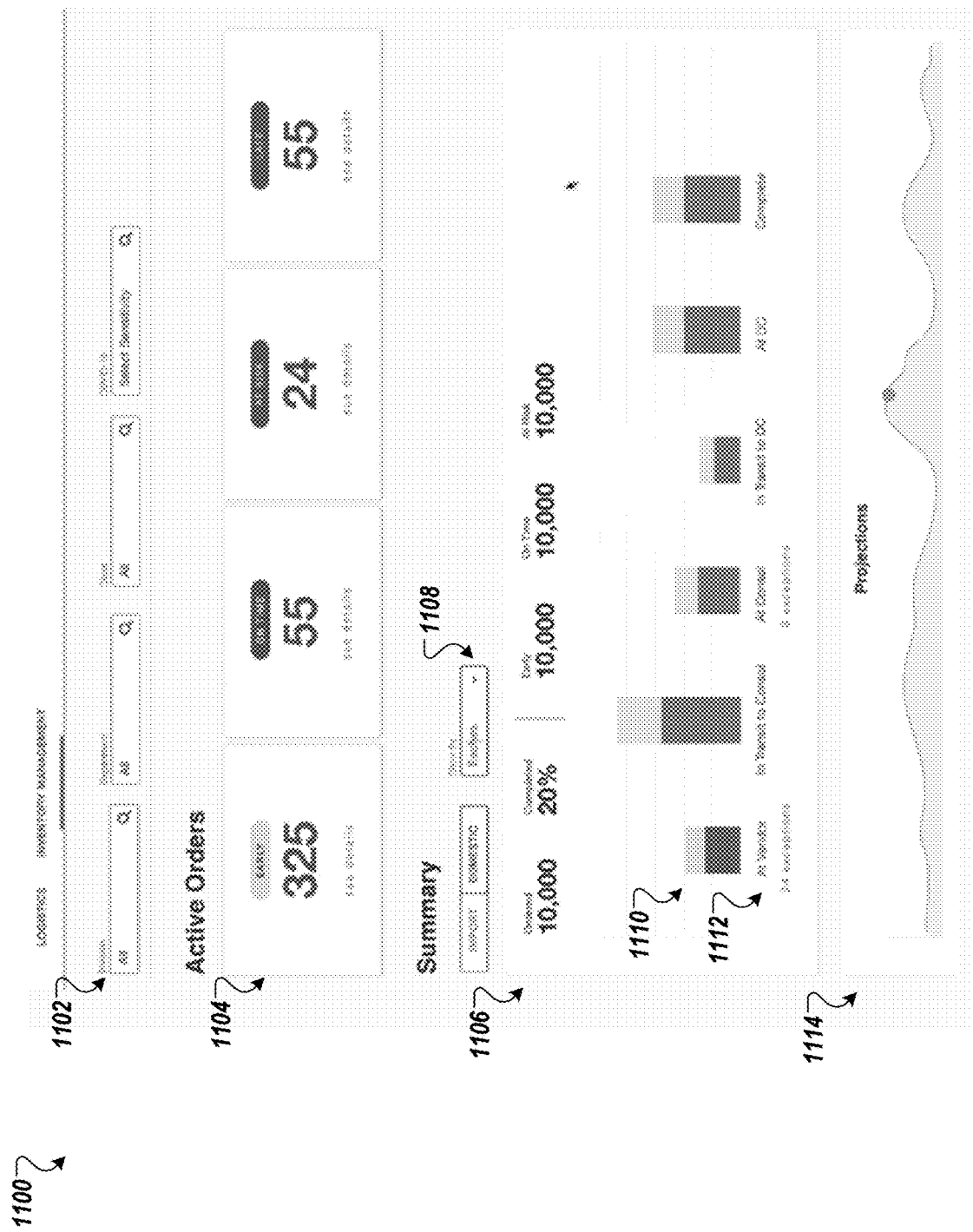
FIG. 11 is a screenshot of an example user interface for presenting high-level supply chain multi-metric factors.

FIG. 11 is a screenshot of an example user interface 1100 for presenting high-level supply chain multi-metric factors. The example user interface 1100 includes selectable search features 1102 through which a user can designate a search query. The interface 1100 also includes high level multi-metric factors 1104 for large swaths of the supply chain (e.g., for all active orders within the supply chain). In this example, the multi-metric factors 1104 are IRD-based status information for all active orders within the supply chain—meaning that the IRD-based status for all active orders within the supply chain are aggregated and presented as a combined multi-factor metric.

The interface 1100 further includes a graphical area 1106 in which multiple multi-factor metrics are combined. In this example, the milestone metric 1112 is combined with the IRD-based status metric 1110 which permits for a breakdown of the IRD-based status for items within all active orders that are currently at the enumerated milestones. The scale that is used for the graphical area 1106 can be toggled, as well, between different values, such as eaches (quantity contained within each item), monetary value of items, and/or others.

The interface 1100 also includes a graph 1114 showing projections according to the multi-factor metrics, which may take into account historical performance against projected future performance.

Figure 12:
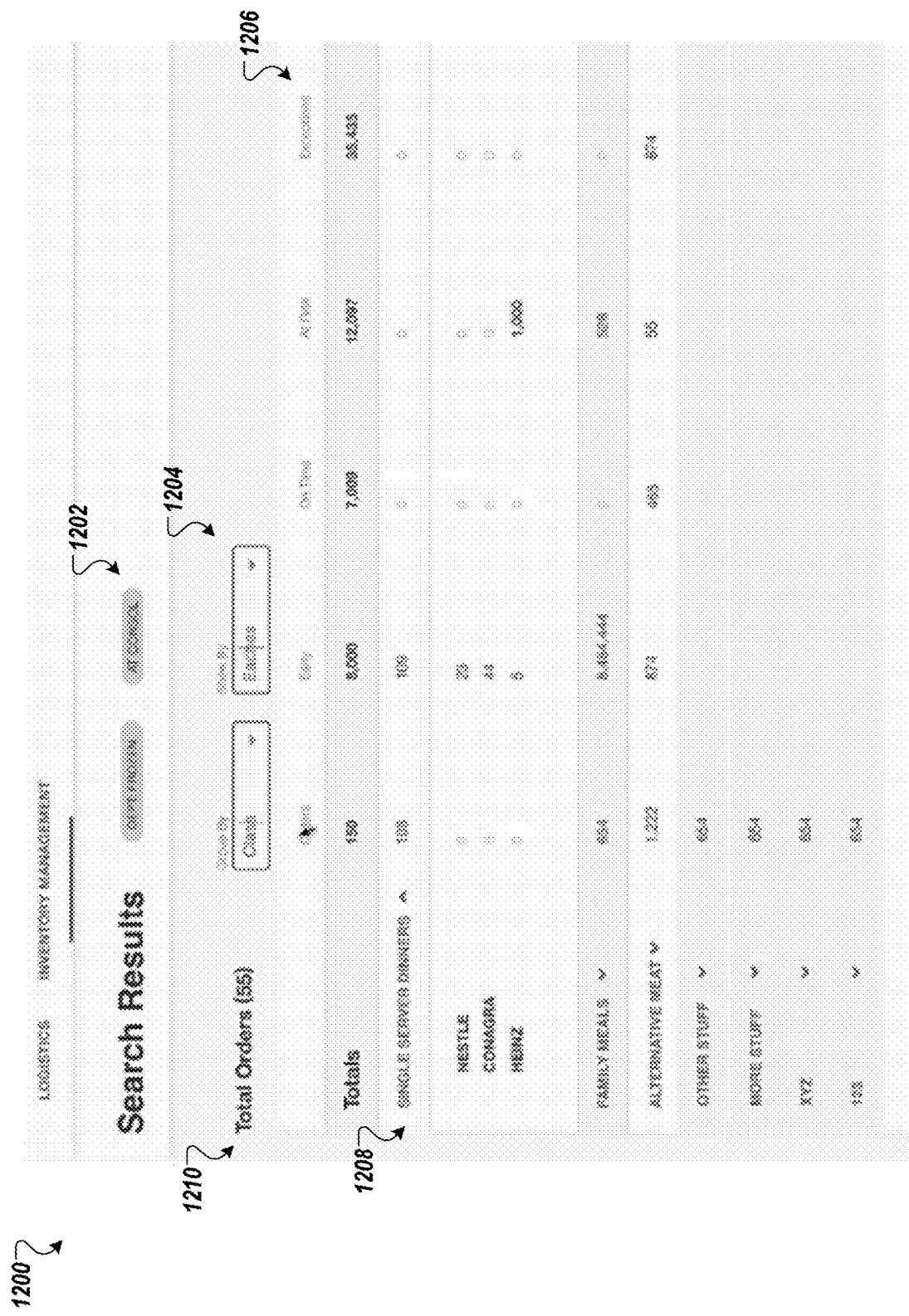
FIG. 12 is a screenshot of an example user interface for presenting high-level supply chain multi-metric factors.

FIG. 12 is a screenshot of an example user interface 1200 for presenting high-level supply chain multi-metric factors. The example user interface 1200 presents search results based on search parameters 1202 (e.g., items are within product taxonomy "dept. frozen" and are at consolidator). The items that satisfy the search parameters 1202, which are spread across 55 total orders in this example (1210), are summarized according to two multi-factor metrics—IRD-based status 1206 and product sub-taxonomy categories for the items 1208. In this example, the quantity of items falling into each of these combined sub-categories (e.g., combination of categories for metric 1206 and metric 1208). The scales by which aggregated category values are presented can be toggled using the user interface features 1204.

Figure 13A:
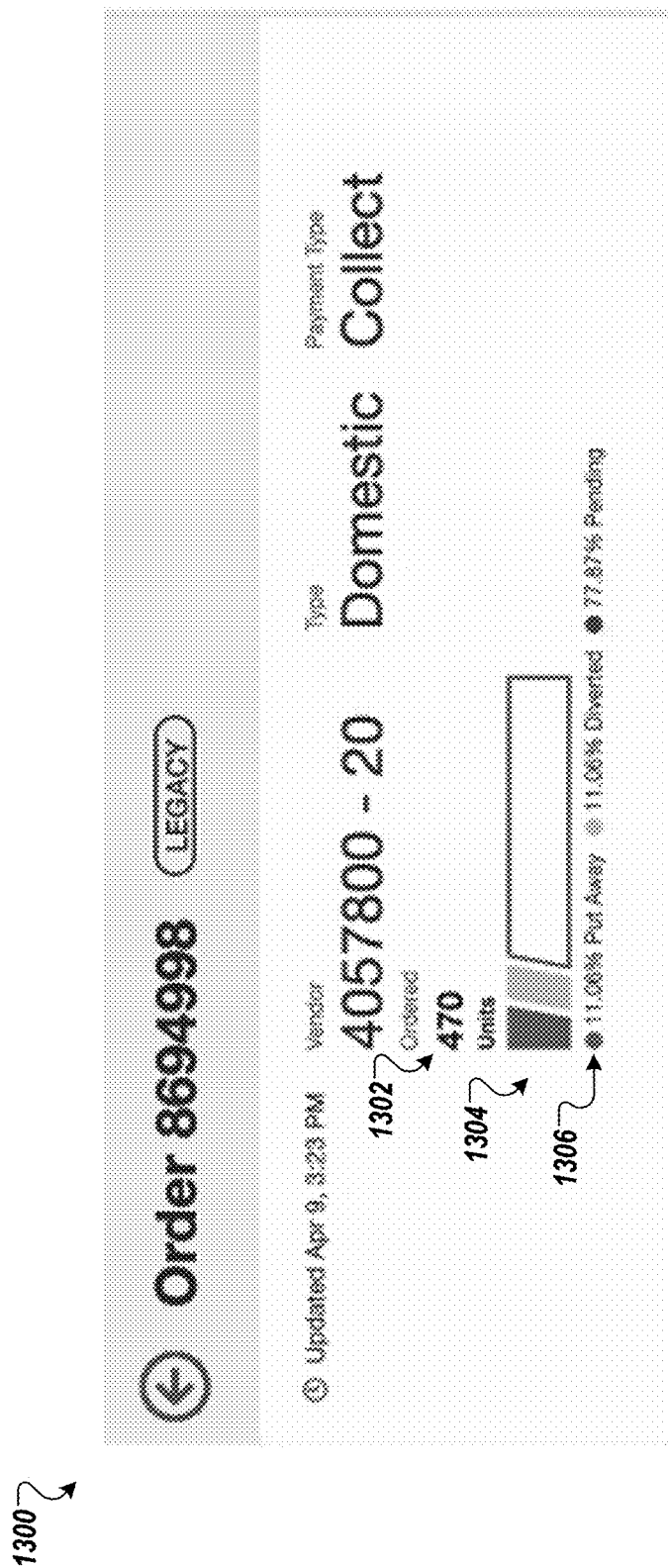
FIGS. 13A-C are screenshots of example user interface features through which a single aggregated metric for a group of items can be graphically represented.
Figure 13B:
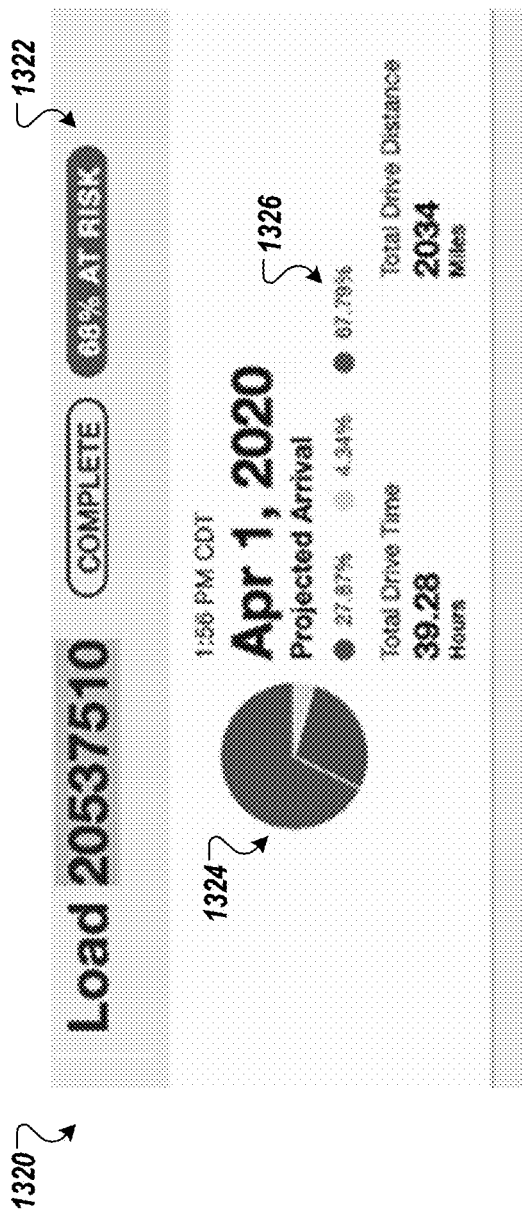
Figure 13C:
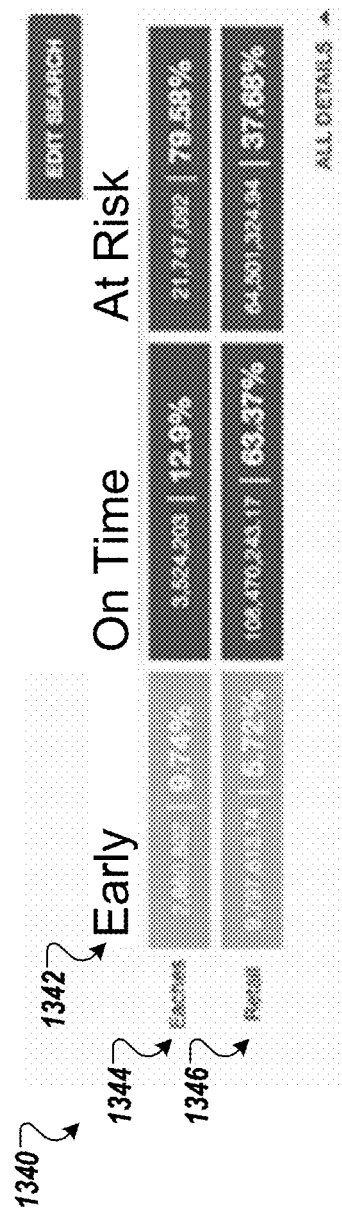

FIGS. 13A-C are screenshots of example user interface features through which a single aggregated metric for a group of items can be graphically represented. These example user interface features are illustrative, and other and additional user interface features are also possible.

Referring to FIG. 13A, an example user interface feature 1300 is shown as including a number of items 1302 and a graphic 1304 visually representing the percentage breakdown of the different categories for the metric 1306.

Referring to FIG. 13B, an example user interface feature 1320 is shown as including a high-level summary of the most common metric category value 1322, along with a pie chart 1324 showing the percentage breakdown of the items being analyzed across the different metric categories 1326.

Referring to FIG. 13C, an example user interface feature 1340 is shown as including a breakdown of two different scales 1344 and 1346 for representing items across different categories 1342 for a metric being evaluated.

Figure 14A:
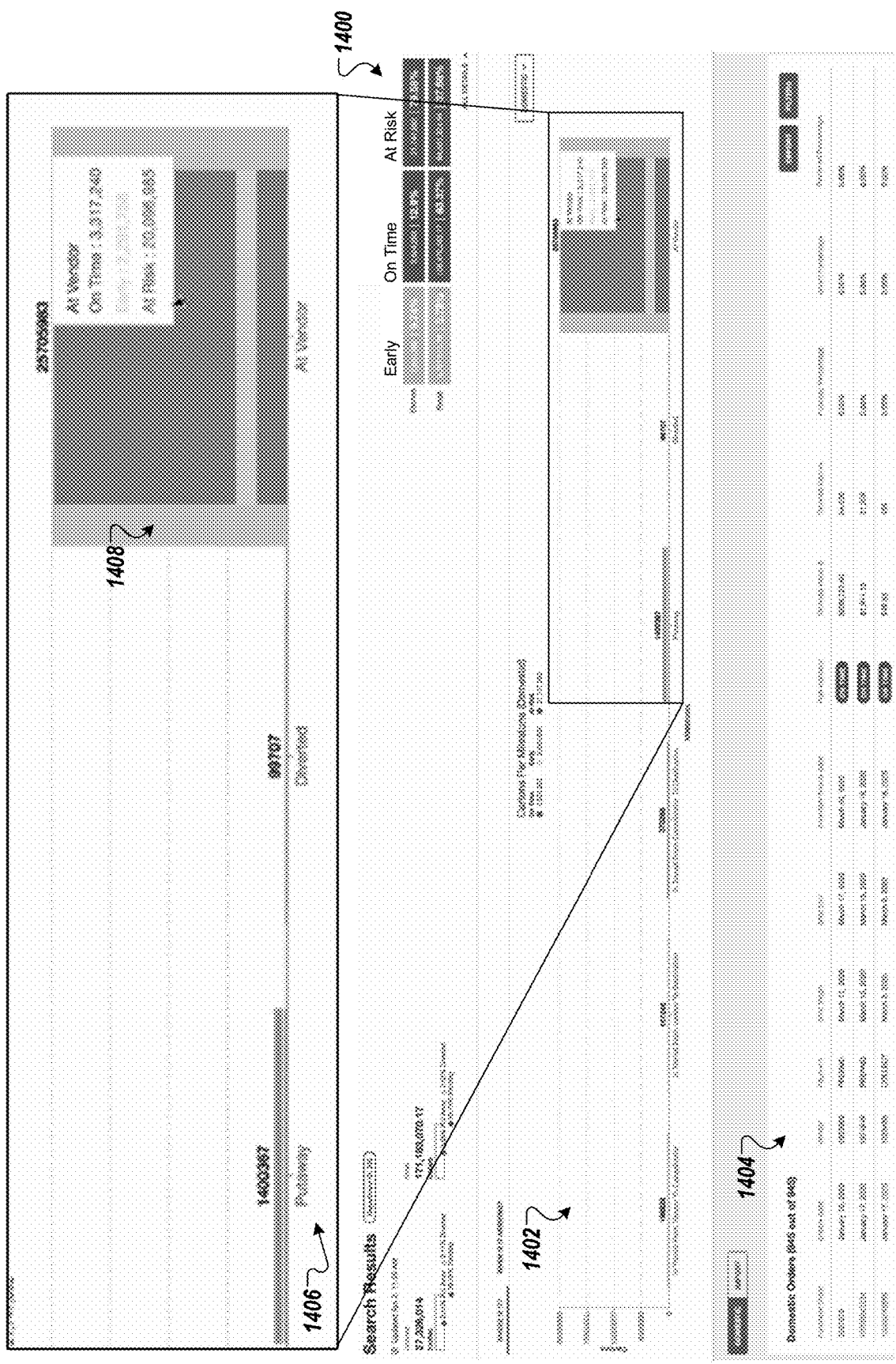
FIGS. 14A-B are screenshots of example user interface features through which a multiple aggregated metrics for a group of items can be graphically represented in combination.
Figure 14B:
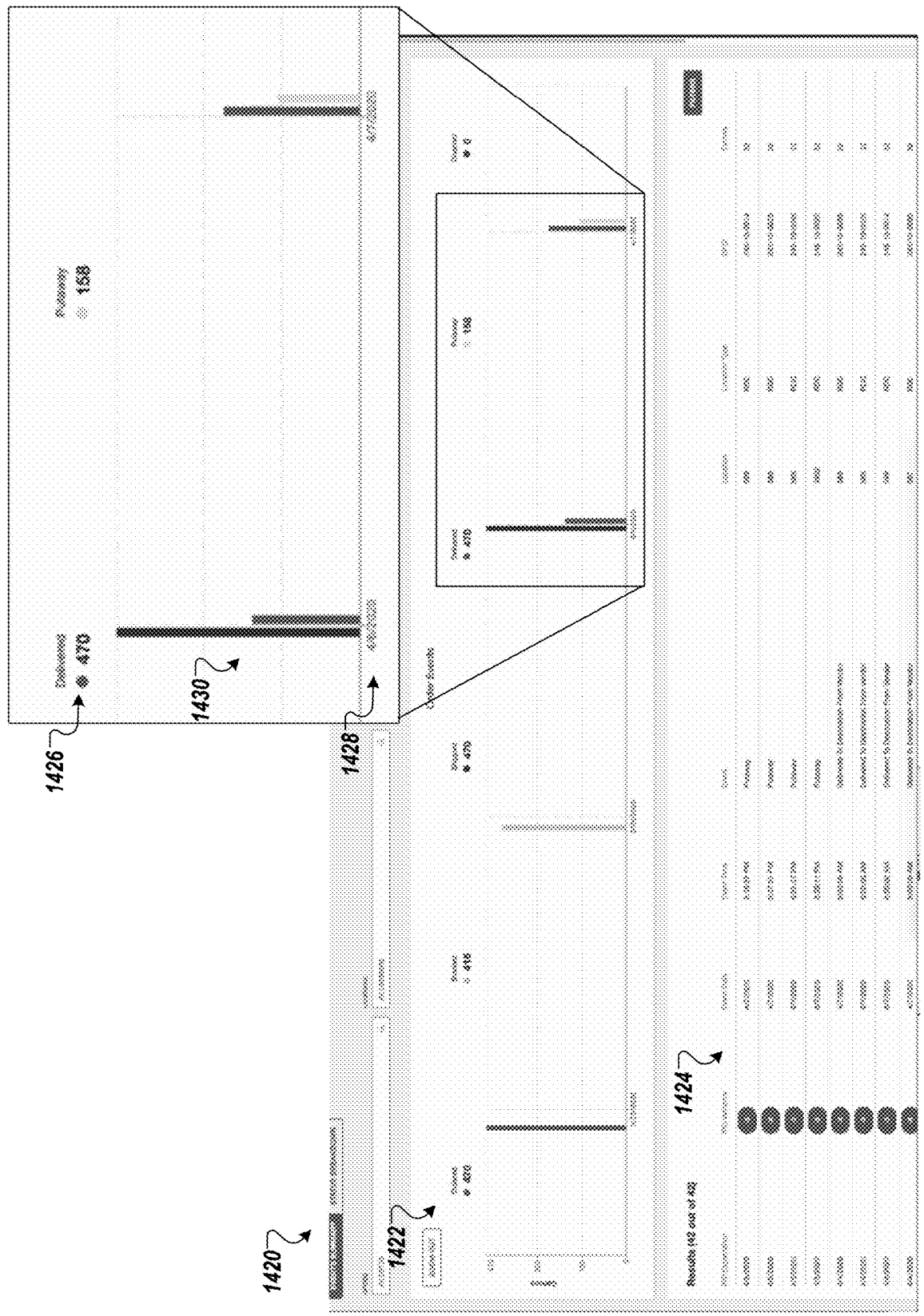

FIGS. 14A-B are screenshots of example user interface features through which a multiple aggregated metrics for a group of items can be graphically represented in combination. These example user interface features are illustrative, and other and additional user interface features are also possible.

Referring to FIG. 14A, an example user interface 1400 is presented with a first area 1402 showing the combination of two different metrics, and a second area 1404 showing a log of the items in the group that is being represented. As shown in the magnified portion of the first area 1402, a first metric 1406 (milestones) is presented along the x-axis and a second metric 1408 (IRD-based status) is presented for each of the items falling into the categories of the first metric.

Referring to FIG. 14B, an example user interface 1420 is presented with a first area 1422 that also shows the combination of two different metrics, and a second area 1424 showing a lot of the items in the group that is being analyzed. In the magnified part of the first area 1422, a first metric 1428 (time) is shown along the x-axis and a second metric 1430 (milestones) and its corresponding categories 1426 are shown along the y-axis.

Figure 15A:
FIGS. 15A-B are screenshots of an example search interface for querying and presenting aggregating supply chain information for user-designated groups of items.
Figure 15B:
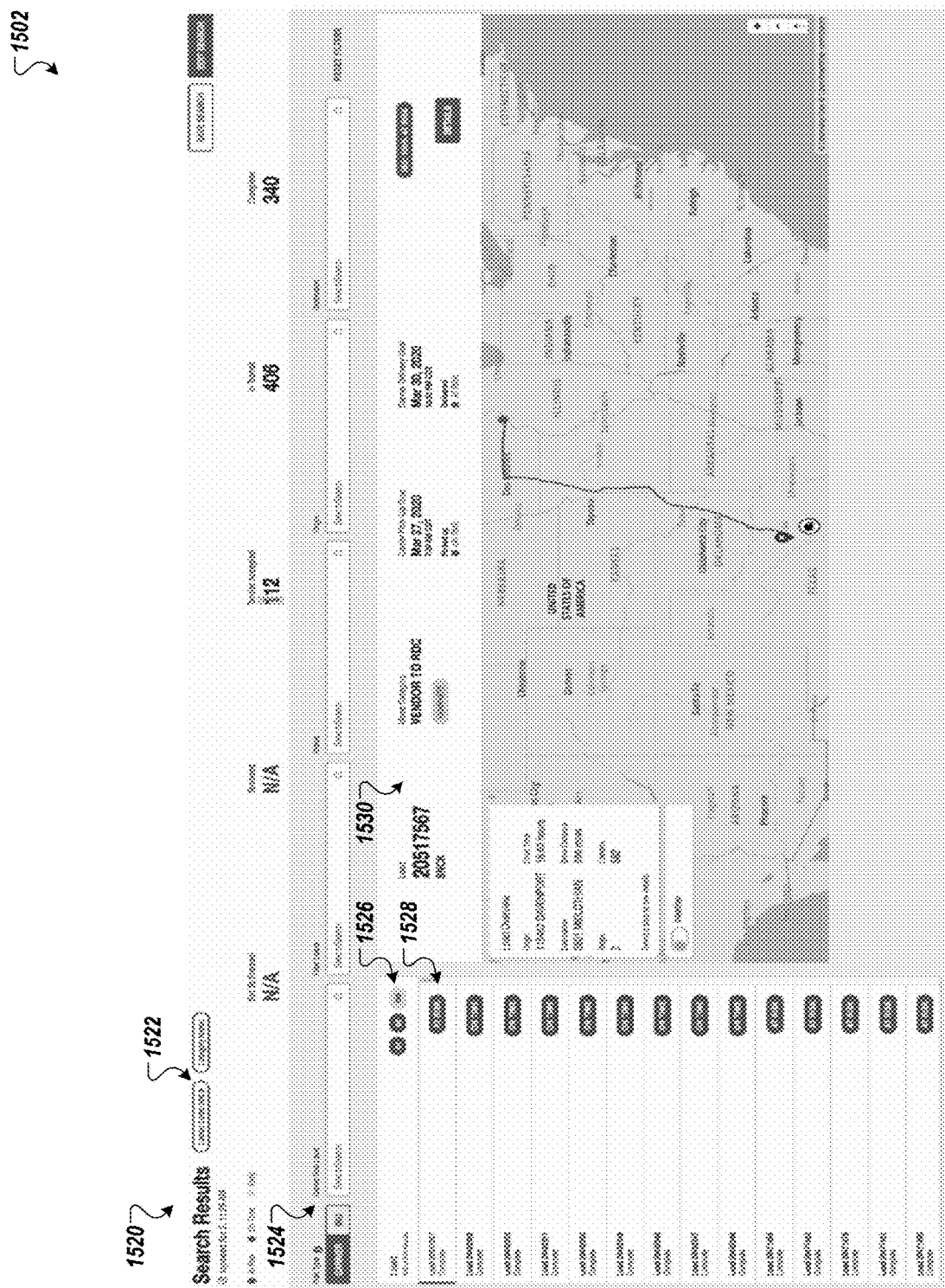

FIGS. 15A-B are screenshots of an example search interface for querying and presenting aggregating supply chain information for user-designated groups of items.

Referring to FIG. 15A, an example user interface 1500 is presented with a search interface 1502 through which a user can designate one or more of multiple different parameters 1504-1516 to generate aggregated metrics for a group of items in the supply chain.

Referring to FIG. 15B, an example user interface 1520 presenting search results is depicted. In the example user interface 1520, which shows results for the search parameters 1522, an aggregated IRD-based status 1526 is presented, along with an itemized list 1528 of the component parts that were aggregated with their corresponding IRD-based status. A user can drill down into the sub-parts of any metric-based assessment, such as selecting one of the itemized list entries 1528, which causes a detailed view 1530 of the selected entry to be presented. In this example, the selected entry 1528 is a particular load that is shown as being "at risk," and the more detailed view shows the current location of the load, a pathway for the load to travel, and other details on the load. The interface 1520 further includes additional search features 1524 through which the existing search query can be modified and/or further refined.

Figure 16:
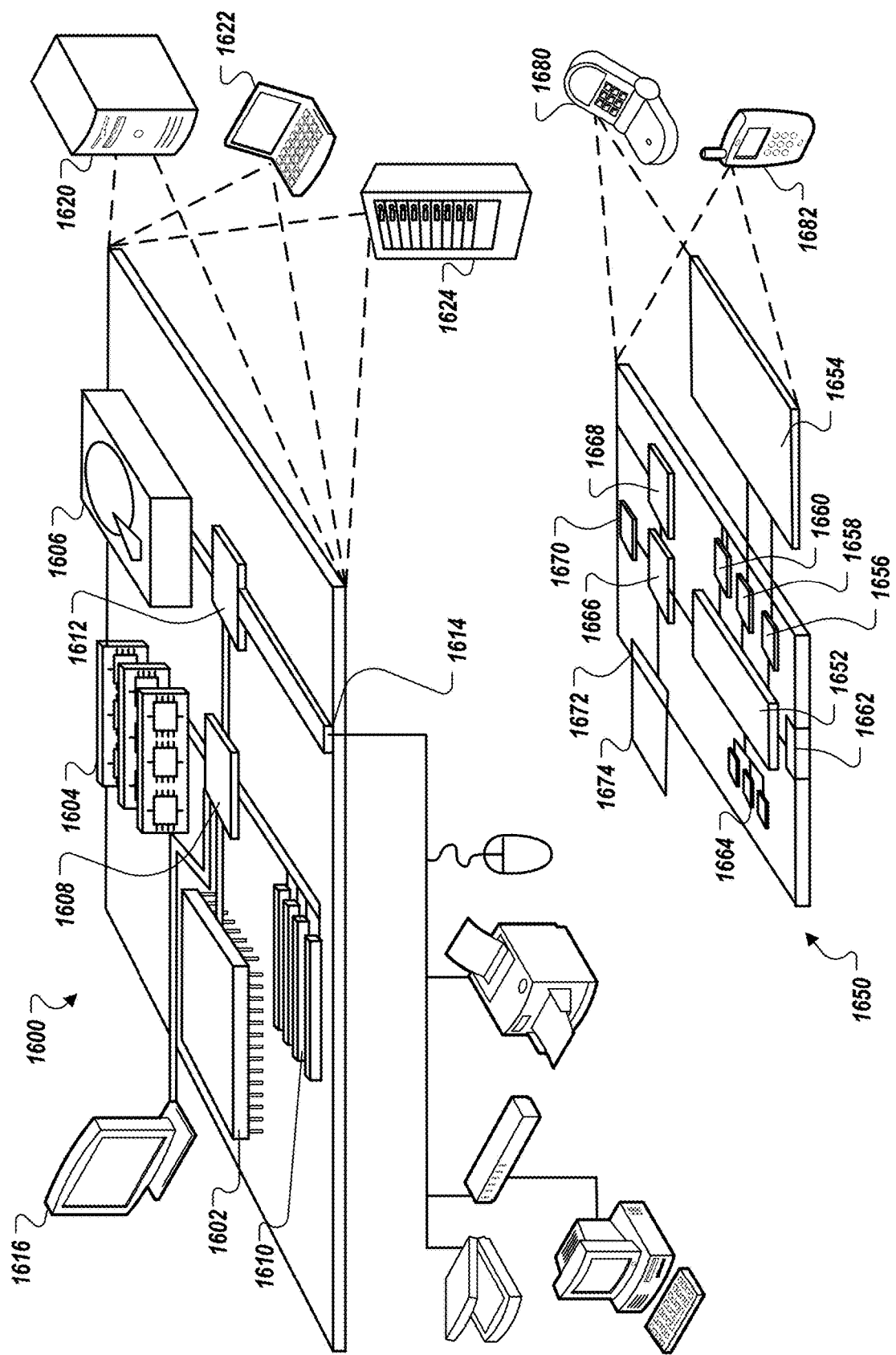
FIG. 16 is a schematic diagram that shows an example of a computing device and a mobile computing device.

FIG. 16 shows an example of a computing device 1600 and an example of a mobile computing device that can be used to implement the techniques described here. The computing device 1600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1600 includes a processor 1602, a memory 1604, a storage device 1606, a high-speed interface 1608 connecting to the memory 1604 and multiple high-speed expansion ports 1610, and a low-speed interface 1612 connecting to a low-speed expansion port 1614 and the storage device 1606. Each of the processor 1602, the memory 1604, the storage device 1606, the high-speed interface 1608, the high-speed expansion ports 1610, and the low-speed interface 1612, are interconnected using various busses, and can be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as a display 1616 coupled to the high-speed interface 1608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1604 stores information within the computing device 1600. In some implementations, the memory 1604 is a volatile memory unit or units. In some implementations, the memory 1604 is a non-volatile memory unit or units. The memory 1604 can also be another form of computer-readable medium, such as a magnetic or optical disk.

The storage device 1606 is capable of providing mass storage for the computing device 1600. In some implementations, the storage device 1606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1604, the storage device 1606, or memory on the processor 1602.

The high-speed interface 1608 manages bandwidth-intensive operations for the computing device 1600, while the low-speed interface 1612 manages lower bandwidth-intensive operations. Such allocation of functions is exemplary only. In some implementations, the high-speed interface 1608 is coupled to the memory 1604, the display 1616 (e.g., through a graphics processor or accelerator), and to the high-speed expansion ports 1610, which can accept various expansion cards (not shown). In the implementation, the low-speed interface 1612 is coupled to the storage device 1606 and the low-speed expansion port 1614. The low-speed expansion port 1614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1600 can be implemented in a number of different forms, as shown in the figure. For example, it can be implemented as a standard server 1620, or multiple times in a group of such servers. In addition, it can be implemented in a personal computer such as a laptop computer 1622. It can also be implemented as part of a rack server system 1624. Alternatively, components from the computing device 1600 can be combined with other components in a mobile device (not shown), such as a mobile computing device 1650. Each of such devices can contain one or more of the computing device 1600 and the mobile computing device 1650, and an entire system can be made up of multiple computing devices communicating with each other.

The mobile computing device 1650 includes a processor 1652, a memory 1664, an input/output device such as a display 1654, a communication interface 1666, and a transceiver 1668, among other components. The mobile computing device 1650 can also be provided with a storage device, such as a micro-drive or other device, to provide additional storage. Each of the processor 1652, the memory 1664, the display 1654, the communication interface 1666, and the transceiver 1668, are interconnected using various buses, and several of the components can be mounted on a common motherboard or in other manners as appropriate.

The processor 1652 can execute instructions within the mobile computing device 1650, including instructions stored in the memory 1664. The processor 1652 can be implemented as a chipset of chips that include separate and multiple analog and digital processors. The processor 1652 can provide, for example, for coordination of the other components of the mobile computing device 1650, such as control of user interfaces, applications run by the mobile computing device 1650, and wireless communication by the mobile computing device 1650.

The processor 1652 can communicate with a user through a control interface 1658 and a display interface 1656 coupled to the display 1654. The display 1654 can be, for example, a TFT (Thin-Film-Transistor Liquid Crystal Display) display or an OLED (Organic Light Emitting Diode) display, or other appropriate display technology. The display interface 1656 can comprise appropriate circuitry for driving the display 1654 to present graphical and other information to a user. The control interface 1658 can receive commands from a user and convert them for submission to the processor 1652. In addition, an external interface 1662 can provide communication with the processor 1652, so as to enable near area communication of the mobile computing device 1650 with other devices. The external interface 1662 can provide, for example, for wired communication in some implementations, or for wireless communication in other implementations, and multiple interfaces can also be used.

The memory 1664 stores information within the mobile computing device 1650. The memory 1664 can be implemented as one or more of a computer-readable medium or media, a volatile memory unit or units, or a non-volatile memory unit or units. An expansion memory 1674 can also be provided and connected to the mobile computing device 1650 through an expansion interface 1672, which can include, for example, a SIMM (Single In Line Memory Module) card interface. The expansion memory 1674 can provide extra storage space for the mobile computing device 1650, or can also store applications or other information for the mobile computing device 1650. Specifically, the expansion memory 1674 can include instructions to carry out or supplement the processes described above, and can include secure information also. Thus, for example, the expansion memory 1674 can be provide as a security module for the mobile computing device 1650, and can be programmed with instructions that permit secure use of the mobile computing device 1650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1664, the expansion memory 1674, or memory on the processor 1652. In some implementations, the computer program product can be received in a propagated signal, for example, over the transceiver 1668 or the external interface 1662.

The mobile computing device 1650 can communicate wirelessly through the communication interface 1666, which can include digital signal processing circuitry where necessary. The communication interface 1666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1668 using a radio-frequency. In addition, short-range communication can occur, such as using a Bluetooth, WiFi, or other such transceiver (not shown). In addition, a GPS (Global Positioning System) receiver module 1670 can provide additional navigation- and location-related wireless data to the mobile computing device 1650, which can be used as appropriate by applications running on the mobile computing device 1650.

The mobile computing device 1650 can also communicate audibly using an audio codec 1660, which can receive spoken information from a user and convert it to usable digital information. The audio codec 1660 can likewise generate audible sound for a user, such as through a speaker, e.g., in a handset of the mobile computing device 1650. Such sound can include sound from voice telephone calls, can include recorded sound (e.g., voice messages, music files, etc.) and can also include sound generated by applications operating on the mobile computing device 1650.

The mobile computing device 1650 can be implemented in a number of different forms, as shown in the figure. For example, it can be implemented as a cellular telephone 1680. It can also be implemented as part of a smart-phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A system for providing interfaces for visualizing and managing a supply chain, the system comprising:
    an inventory readiness date system comprising at least a first processor and a first memory storing date system instructions that, when executed, cause the inventory readiness data system to generate inventory readiness dates and milestone dates for items in the supply chain, wherein the inventory readiness dates (i) are calendar dates on which the items are expected to be available for distribution at destination locations, (ii) are generated upon creation of orders for the items, and (iii) are configured to remain fixed and unchanged for the items regardless of events affecting delivery of the items to the destination locations, and wherein the milestone dates are calendar dates by which milestone events are identified to occur to stay on track to satisfy the inventory readiness date;

a supply chain data system comprising at least a second processor and a second memory storing data system instructions that, when executed, cause the supply chain data system to receive and aggregate supply chain information for the items from a plurality of supply chain data sources, wherein the supply chain information specifies, for each item, data values across multiple data dimensions, wherein the supply chain data system is configured to perform operations comprising:

receiving transit event data that indicates that a physical location of one or more of the items has changed;

in response to receiving the transit event data, determining a readiness status for each of the one or more items for which the transit event data pertains, by (i) determining one or more projected milestone dates for the item based on the received transit event data, and (ii) comparing the one or more projected milestone dates for the item to corresponding milestone dates for the item, wherein the readiness status corresponds to an enumerated category that indicates whether the item is on track to satisfy its inventory readiness date; and for each of the one or more items for which the transit event data pertains, storing the readiness status that has been determined for the item; and a supply chain tracking system comprising at least a third processor and a third memory storing tracking system instructions that, when executed, cause the supply chain tracking system to generate and present interfaces for visualizing and managing the supply chain, wherein the supply chain tracking system is configured to perform operations comprising:

receiving through a communication network a search request with search parameters from a client computing device remote from the supply chain tracking system, wherein the search parameters include one or more specified values for one or more specified data dimensions for the items;

identifying, from the supply chain data system, a portion of the items that satisfy the search parameters;

generating aggregated multi-factor metrics for the portion of the items that satisfy the search parameters, comprising: (i) for each item of the portion of the items, identifying, from the supply chain information of the supply chain data system, the readiness status of the item, and (ii) aggregating the items that have readiness statuses that belong to a same enumerated category, wherein the aggregated multi-factor metrics are a multi-part score that represents projections for meeting future inventory readiness dates for the items of the portion of the items according to their enumerated categories;

outputting the aggregated multi-factor metrics for presentation in an interface on the client computing device; and generating and transmitting, based on the aggregated multi-factor metrics meeting a threshold value, computer-readable instructions to one or more automated load handling systems to expedite a particular load that includes a threshold number of items that are projected to miss their inventory readiness dates, wherein the one or more automated load handling systems are configured to, upon receipt of the computer-readable instructions, automatically perform one or more operations to expedite processing of the particular load.

2. The system of claim 1, wherein generating aggregated multi-factor metrics for the portion of the items comprises:

determining item proportions of the portion of the items that satisfy the enumerated categories, wherein the enumerated categories include an ahead of schedule category, an on schedule category, and a behind schedule category, wherein the multi-factor metrics include the item proportions.

3. The system of claim 2, wherein determining item proportions of the portion of the items that satisfy the enumerated categories comprises:

for a first metric of the plurality of metrics:
identifying first enumerated categories for the first metric; and
determining first groups of items that correspond to the first enumerated categories, wherein items from the portion of items are allocated to the first groups based on which of the first enumerated categories they satisfy;

for a second metric of the plurality of metrics:
identifying second enumerated categories for the second metric;
for each of the first groups of items:
determining second groups of items that further subdivide the first group of items and correspond to the second enumerated categories, wherein items from the first group of items are allocated to the second groups based on which of the second enumerated categories they satisfy;

determining aggregate first group values for the first groups of items and aggregate second group values for the second groups of items within each of the first groups, wherein item proportions comprise the aggregate first group values and the aggregate second group values.

4. The system of claim 3, wherein:
the first metric comprises a current location for the items, and
the second metric comprises a current inventory readiness date status of the items that is determined based on a comparison of the current location for the items relative to one or more of the milestones.

5. The system of claim 3, wherein:
the first metric comprises a current inventory readiness date status of the items that is determined based on a comparison of a current location for the items relative to one or more of the milestones, and
the second metric comprises the current location for the items.

6. The system of claim 3, wherein:
the first metric comprises one or more dates on which milestone events occur, and
the second metric comprises the milestone events.

7. The system of claim 3, wherein:
the first metric comprises the milestone events, and
the second metric comprises one or more dates on which milestone events occur.

8. The system of claim 3, wherein:
the first metric comprises vendors that are supplying the items, and
the second metric comprises a current inventory readiness date status of the items that is determined based on a comparison of current locations for the items relative to one or more of the milestones.

9. The system of claim 3, wherein:
the first metric comprises carriers that are transporting the items from source locations to the destination locations, and
the second metric comprises a current inventory readiness date status of the items that is determined based on a comparison of current locations for the items relative to one or more of the milestones.

10. The system of claim 3, wherein:
the first metric comprises distribution centers that comprise the destination locations the items, and
the second metric comprises a current inventory readiness date status of the items that is determined based on a comparison of current locations for the items relative to one or more of the milestones.

11. The system of claim 3, wherein:
the first metric comprises retail departments into which the items are classified within a retail environment, and
the second metric comprises a current inventory readiness date status of the items that is determined based on a comparison of current locations for the items relative to one or more of the milestones.

12. The system of claim 3, wherein:
the first metric comprises product taxonomies for the items within a retail environment, and
the second metric comprises a current inventory readiness date status of the items that is determined based on a comparison of current locations for the items relative to one or more of the milestones.

13. The system of claim 3, wherein outputting the multi-factor metric for presentation in the interface on the client computing device comprises:

designating first visual elements for presentation in the interface that correspond to the first aggregate group values, and
designating, for each of the first aggregate group values and its corresponding first visual element, second visual elements that correspond to the second aggregate group values that further subdivide the first aggregate group value, the second visual elements being designated for presentation within a visual boundary of a corresponding first visual element,
wherein the first visual elements and the second visual elements are output for presentation in the interface on the client computing device.

14. The system of claim 1, wherein the portion of the items comprise particular items that are part of one or more orders specified in the search parameters and wherein the orders are spread across multiple loads in the supply chain.

15. The system of claim 1, wherein the portion of the items comprise particular items that are part of one or more loads specified in the search parameters and wherein the particular items are distributed across multiple different orders in the supply chain.

16. The system of claim 1, wherein the portion of the items comprise particular items that are supplied by one or more vendors specified in the search parameters.

17. The system of claim 1, wherein the portion of the items comprise particular items that are transported by one or more carriers specified in the search parameters.

18. The system of claim 1, wherein the portion of the items comprise particular items that are being delivered to one or more distribution centers specified in the search parameters.

19. The system of claim 1, wherein the transit event data that indicates that the physical location of one or more of the items has changed is generated based on global positioning data from a vehicle that is transporting the one or more of the items.

20. The system of claim 1, wherein the transit event data that indicates that the physical location of one or more of the items has changed is generated based on tracking information that results from the handling of a container that includes the one or more of the items.

* * * * *